(12) United States Patent
Chan et al.

(10) Patent No.: US 9,733,355 B2
(45) Date of Patent: *Aug. 15, 2017

(54) SYSTEMS AND METHODS FOR DETECTING SOIL CHARACTERISTICS

(71) Applicant: Elwha LLC, Bellevue, WA (US)

(72) Inventors: Alistair K. Chan, Bainbridge Island, WA (US); William D. Duncan, Sammamish, WA (US); Roderick A. Hyde, Redmond, WA (US); Lowell L. Wood, Jr., Bellevue, WA (US)

(73) Assignee: Elwha LLC

( * ) Notice: Subject to any disclaimer, the term of this patent is extended or adjusted under 35 U.S.C. 154(b) by 0 days.

This patent is subject to a terminal disclaimer.

(21) Appl. No.: 15/450,476

(22) Filed: Mar. 6, 2017

(65) Prior Publication Data

US 2017/0176589 A1 Jun. 22, 2017

Related U.S. Application Data

(63) Continuation of application No. 14/983,105, filed on Dec. 29, 2015, now Pat. No. 9,618,614, which is a (Continued)

(51) Int. Cl.
*G01S 13/89* (2006.01)
*G01S 13/88* (2006.01)
(Continued)

(52) U.S. Cl.
CPC .............. *G01S 13/89* (2013.01); *A01B 69/00* (2013.01); *A01C 7/085* (2013.01); *A01C 7/102* (2013.01);
(Continued)

(58) Field of Classification Search
CPC A01C 7/00; A01C 11/02; A01B 79/00; G01S 13/88; G01C 21/32
(Continued)

(56) References Cited

U.S. PATENT DOCUMENTS 4,438,710 A 3/1984 Paladino
4,444,130 A 4/1984 Ray
(Continued)

FOREIGN PATENT DOCUMENTS

WO WO 98/21927 5/1998
WO WO 03/038730 5/2003

OTHER PUBLICATIONS

Lunt et al., "Soil moisture content estimation using ground-penetrating radar reflection data", Journal of Hydrology, 2005, vol. 307, pp. 254-269.
(Continued)

*Primary Examiner* — McDieunel Marc

(57) ABSTRACT

A soil detection and planting apparatus. The apparatus includes a vehicle and a controller coupled to the vehicle. The apparatus further includes a planting device coupled to the vehicle, the planting device configured to plant seeds or plants into a soil material. The apparatus includes a ground penetrating radar sensor coupled to the vehicle. The ground penetrating radar soil sensor is configured to scan the soil material up to a designated depth beneath a surface of the soil material, wherein the ground penetrating radar soil sensor is further configured to provide a sensor feedback signal to the controller with respect to an intrinsic characteristic of the soil material. The controller is configured to instruct placement of a seed or a plant into the soil material based on the feedback signal.

35 Claims, 12 Drawing Sheets

Related U.S. Application Data continuation of application No. 14/468,547, filed on Aug. 26, 2014, now Pat. No. 9,265,192, which is a continuation of application No. 13/898,298, filed on May 20, 2013, now Pat. No. 8,849,523.

(51) Int. Cl.

| | | |
|---|---|---|
| *G01S 15/89* | (2006.01) | |
| *A01C 23/04* | (2006.01) | |
| *A01C 7/08* | (2006.01) | |
| *A01C 7/10* | (2006.01) | |
| *A01G 25/16* | (2006.01) | |
| *A01B 69/00* | (2006.01) | |
| *B64D 1/18* | (2006.01) | |
| *B64D 43/00* | (2006.01) | |

(52) U.S. Cl.
CPC ............ *A01C 23/04* (2013.01); *A01G 25/167* (2013.01); *B64D 1/18* (2013.01); *B64D 43/00* (2013.01); *G01S 13/885* (2013.01); *G01S 13/887* (2013.01); *G01S 15/89* (2013.01)

(58) Field of Classification Search
USPC .............................................. 701/50; 111/149
See application file for complete search history.

(56) References Cited

U.S. PATENT DOCUMENTS

| | | | |
|---|---|---|---|
| 5,467,271 | A | 11/1995 | Abel et al. |
| 6,016,713 | A | 1/2000 | Hale |
| 6,041,582 | A | 3/2000 | Tiede et al. |
| 6,164,223 | A | 12/2000 | Eriksson |
| 6,167,821 | B1 | 1/2001 | Beggs |
| 7,441,393 | B2 | 10/2008 | Piva et al. |
| 8,061,282 | B2 | 11/2011 | Borland |
| 8,195,342 | B2 | 6/2012 | Anderson |
| 8,224,500 | B2 | 7/2012 | Anderson |
| 8,560,145 | B2 | 10/2013 | Anderson |
| 8,849,523 | B1 * | 9/2014 | Chan ................ G01S 13/89 111/149 |
| 9,265,192 | B2 * | 2/2016 | Chan ................ G01S 13/89 |
| 9,618,614 | B2 * | 4/2017 | Chan ................ G01S 13/89 |
| 2003/0016029 | A1 | 1/2003 | Schuler et al. |
| 2004/0225444 | A1 | 11/2004 | Young et al. |
| 2007/0151223 | A1 | 7/2007 | Piva et al. |
| 2009/0259483 | A1 | 10/2009 | Hendrickson et al. |
| 2010/0063648 | A1 | 3/2010 | Anderson |
| 2010/0063954 | A1 | 3/2010 | Anderson |
| 2011/0126746 | A1 | 6/2011 | Borland |
| 2012/0277932 | A1 | 11/2012 | Anderson |
| 2013/0112122 | A1 | 5/2013 | Blomme et al. |
| 2016/0071410 | A1 | 3/2016 | Rupp et al. |

OTHER PUBLICATIONS

Rogers et al., "Soil Electromagnetic Mapping for Enhanced GPR Utility Location", Date Unknown, 12 pages.

Sucre et al., "The Use of Ground-Penetrating Radar to Accurately Estimate Soil Depth in Rocky Forest Soils", Forest Science, 2011, vol. 57(1), pp. 59-66.

Chinese State Intellectual Property Office, Notification of the First Office Action, App. No. 201480029258.2 (Based on PCT Patent Application No. PCT/US2014/038463); dated Dec. 5, 2016; pp. 1-12 (machine translation provided, 9 pages total).

European Patent Office; Extended European Search Report, Pursuant to Rule 62 EPC; App. No. EP 14801012.7; Dec. 12, 2016; pp. 1-7.

\* cited by examiner

SYSTEMS AND METHODS FOR DETECTING SOIL CHARACTERISTICS

CROSS-REFERENCE TO RELATED PATENT APPLICATIONS

This application is a continuation of application Ser. No. 14/983,105, filed Dec. 29, 2015, which is a continuation of application Ser. No. 14/468,547, filed Aug. 26, 2014 (now U.S. Pat. No. 9,265,192), which is a continuation of application Ser. No. 13/898,298, filed May 20, 2013 (now U.S. Pat. No. 8,849,523), the entire disclosures of which are incorporated herein by reference.

BACKGROUND

Agricultural growing operations operate efficiently when, among other things, seeds are planted in soil having optimal soil characteristics and the seeds are provided optimal amounts water and nutrients. Soil characteristics (e.g., soil composition, soil density, nutrient presence, humus presence, etc.) vary from location to location, both globally (e.g., from geographic region to geographic region) and locally (e.g., from spot to spot within a single area of land). Further, the presence of soil moisture from natural sources or from man-made irrigation systems, varies from location to location.

Generally, a single agricultural growing operation involves planting a specific type of seed according to a set pattern over many acres of land (e.g., planting a field of corn in rows). Soil characteristics will often vary over the area of land used for the agricultural growing operation. Despite the variances in soil characteristics, seeds are generally planted in the same manner across the entire area of land used for growing operation. Further, many agricultural growing operations utilize man made delivery systems for water, nutrients, fertilizers, and/or other chemicals and soil additives. The delivery systems are buried or placed on the surface of the soil. The delivery systems are at risk of being damaged or destroyed as agricultural equipment disturbs the soil to plants seeds, harvests crops, and tills soil material.

SUMMARY

One exemplary embodiment relates to a soil detection and planting apparatus. The apparatus includes a vehicle and a controller coupled to the vehicle. The apparatus further includes a planting device coupled to the vehicle, the planting device configured to plant seeds or plants into a soil material. The apparatus includes a ground penetrating radar sensor coupled to the vehicle. The ground penetrating radar soil sensor is configured to scan the soil material up to a designated depth beneath a surface of the soil material, wherein the ground penetrating radar soil sensor is further configured to provide a sensor feedback signal to the controller with respect to an intrinsic characteristic of the soil material. The controller is configured to instruct placement of a seed or a plant into the soil material based on the feedback signal.

Another exemplary embodiment relates to a soil detection apparatus. The apparatus includes a housing coupled to a ground-driven vehicle. The apparatus further includes a controller coupled to the housing. The apparatus includes a ground penetrating radar soil sensor coupled to the housing. The ground penetrating radar soil sensor is configured to scan a soil material up to a designated depth beneath a surface of the soil material, wherein the ground penetrating radar soil sensor is further configured to provide a sensor feedback signal to the controller with respect to an intrinsic characteristic of the soil material. The apparatus further includes a location sensor coupled to the housing. The location sensor is configured to provide a location feedback signal to the controller. The controller is configured to create a map of the soil material based on the sensor feedback signal and the location feedback signal.

Yet another exemplary embodiment relates to an air-based soil detection apparatus. The apparatus includes an aircraft and a controller coupled to the aircraft. The apparatus further includes a soil sensor coupled to the aircraft. The soil sensor is configured to scan a soil material up to a designated depth beneath a surface of the soil material to locate at least a portion of an irrigation system contained within the soil material or on a surface of the soil material, wherein the soil sensor is further configured to provide a sensor feedback signal relating to the detected portion of the irrigation system to the controller. The apparatus includes a location sensor coupled to the aircraft. The location sensor is configured to provide a location feedback signal to the controller. The controller is configured to create a map of the soil material including a location of the portion of the irrigation system based on the sensor feedback signal and the location feedback signal.

A further exemplary embodiment relates to a method of operating a vehicle including a controller. The vehicle is configured to map soil characteristics and plant seeds or plants. The method includes detecting intrinsic soil characteristics of a soil material through a ground penetrating radar unit coupled to the vehicle, wherein the ground penetrating radar unit is configured to scan the soil material up to a designated depth beneath a surface of the soil material, and wherein the ground penetrating radar unit is further configured to provide a sensor feedback signal to a controller with respect to the intrinsic soil characteristics. The method further includes, in response to the intrinsic soil characteristics, instructing a planting mechanism coupled to the vehicle to plant a seed or a plant.

Another exemplary embodiment relates to a method of mapping soil characteristics with a vehicle having a controller. The method includes receiving operating parameters through a user input of the vehicle. The method further includes navigating the vehicle through a vehicle path. The method further includes detecting intrinsic soil characteristics of a soil material through a ground penetrating radar unit coupled to the vehicle, wherein the ground penetrating radar unit is configured to scan the soil material up to a designated depth beneath a surface of the soil material, and wherein the ground penetrating radar unit is further configured to provide a sensor feedback signal to a controller of the vehicle. The method includes tracking a location of the vehicle through a location sensor coupled to the vehicle. The method further includes creating a map of an area of land traversed by the vehicle, wherein the map includes detected intrinsic soil characteristics, wherein the map is configured to be later updated to include the location of a planted plant or a planted seed.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
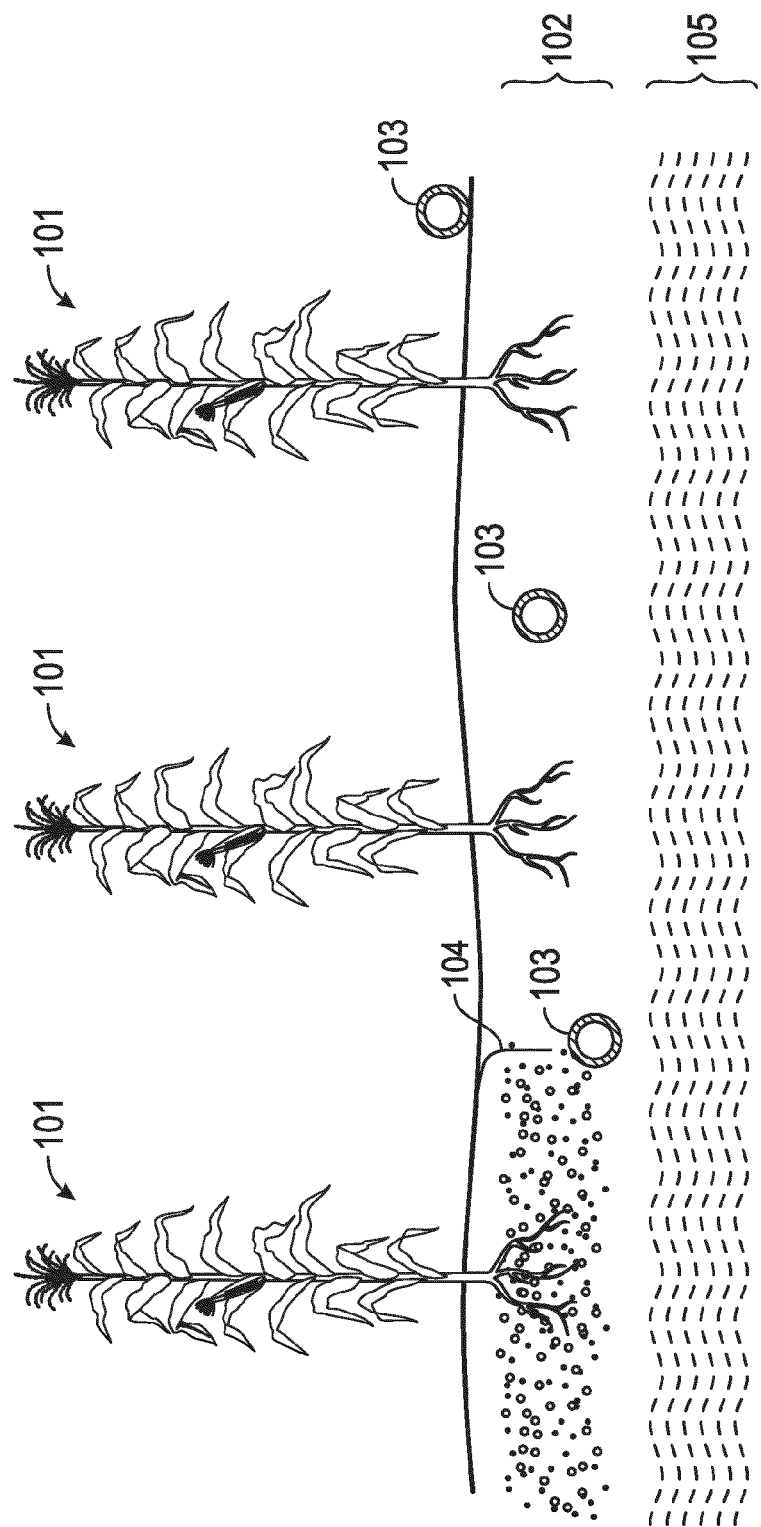
FIG. 1 is a an exemplary view of corn planted in soil.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Referring to FIG. 1, a cross-section of an agricultural growing operation is shown. Corn 101 is planted in soil 102. The agricultural growing operation utilizes delivery pipes 103. Delivery pipes 103 provide water, pesticides, nutrients, and/or other chemicals to soil 102. Delivery pipes 103 are located at varying distances beneath the surface of soil 102 or are located on the surface of soil 102. Further, the composition and characteristics of soil 102 varies at different locations. For example, soil 102 may contain varying amounts of rocks 104, soil water 105, nutrients, pesticides, humus, and other elements or objects. Optimal seed placement varies with location along the surface of soil 102. For example, a farmer does not wish to plant seeds in the middle of sub-surface rocks, but does wish to plant seeds at a depth such that roots of the plants will reach sub-surface water contained within soil 102 or within percolation distance from delivery pipes 103. Further, it is desirable to plant seeds such that agricultural machinery (e.g., planters, tillers, combines, etc.) will not damage placed delivery pipes 103.

Figure 2A:
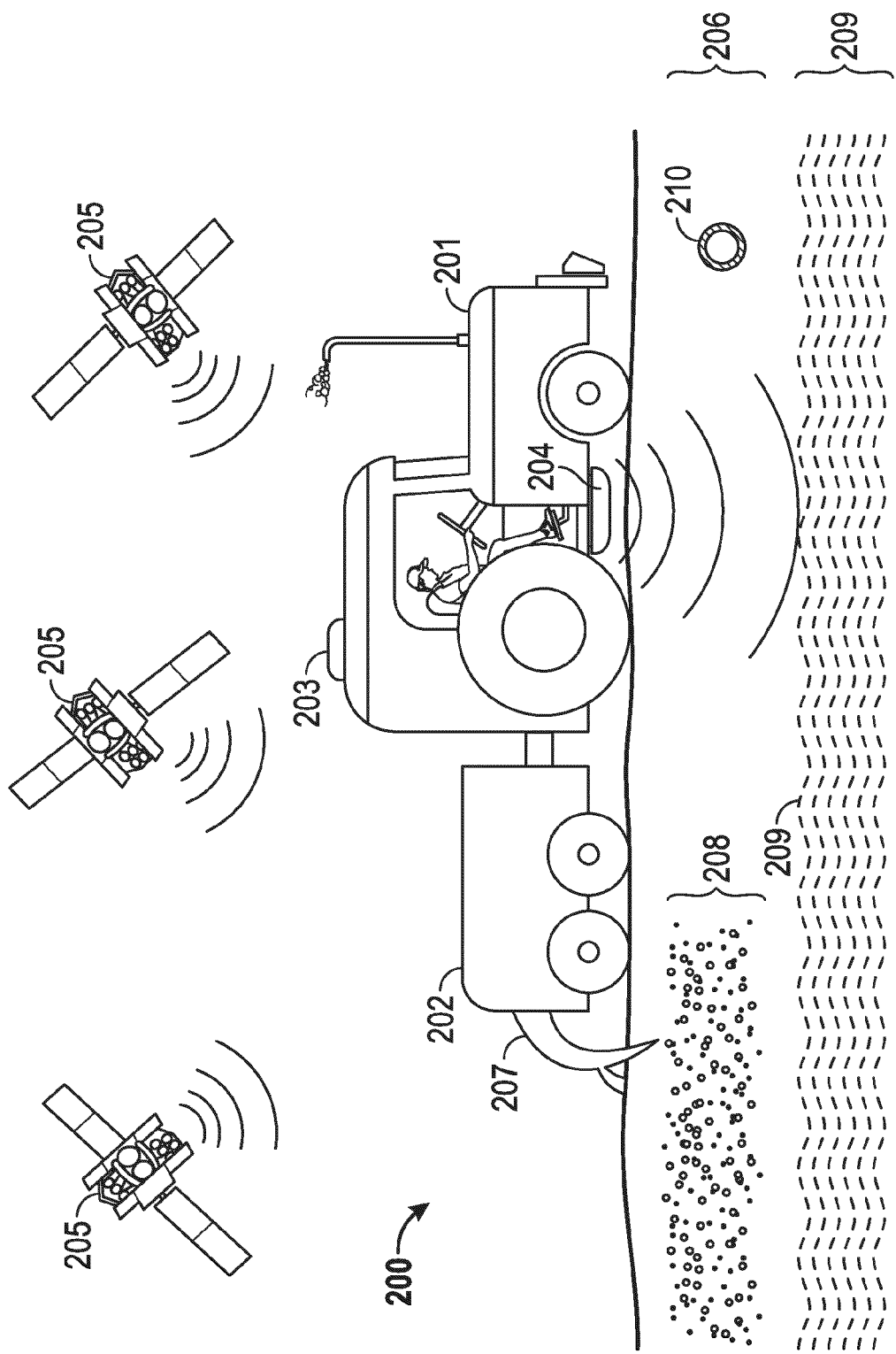
FIG. 2A is a soil detection and planting system according to an exemplary embodiment.

Referring to FIG. 2, a soil characteristic mapping and planting system 200 is shown according to an exemplary embodiment. System 200 includes a ground-driven vehicle 201 and a planting device 202. Although system 200 shows planting device 202 as being towed by vehicle 201, planting device 202 may be integrated into vehicle 201. Vehicle 201 includes GPS receiver 203 and a ground or soil sensor, shown as ground penetrating radar unit 204. GPS receiver 203 receives signals from GPS satellites 205 and is configured to provide a feedback signal used to track the location of vehicle 201. Radar unit 204 utilizes ground penetrating radar to determine intrinsic and extrinsic characteristics of soil 206. Exemplary intrinsic soil characteristics may include a composition of the soil material, a water property of the soil (e.g., how much water is contained in the soil and how deep the water is located), a presence of humus in the soil material, a density of the soil material, a soil material porosity, and any other intrinsic characteristics soil 206 may have. Exemplary extrinsic soil characteristics may include the presence of soil 206, the depth of soil 206, an object buried in soil 206 (e.g., rocks, wood, ore deposits, pipes, etc.), and any other extrinsic characteristic of soil 206. Planting device 202 includes a planter 207. Planter 207 is configured to dig a hole or trench in soil 206, place a seed in the hole or trench, and cover the seed with displaced soil material. Planter 207 is depth adjustable such that seeds can be buried at different depths within soil 206. Planter 207 is controllable such that seeds can be placed at various densities (e.g., at a designated number of seeds per area planted, on a seed-by-seed basis, etc.). System 200 is generally configured to detect soil characteristics through radar unit 204 and adjust planting device 202 based on detected soil characteristics. Further, system 200 is configured to generate a map of soil 206 by pairing location data from GPS receiver 203 with soil characteristic data from radar unit 204. The map created by system 200 is a collection of data points coupled to location information, that when processed, may be reproduced into a visual representation of the map (e.g., for viewing by an operator through a display) or a set of data and location points for further processing by a system controller (e.g., to properly instruct plant or seed placement). The collected map data points may be stored in an R-tree data structure, an array data structure, or another suitable data structure. The map may be a three-dimensional map. The details of the operation of system 200 are described below.

In one embodiment, radar unit 204 is a non-insertion soil-penetrating radar unit. Alternatively, radar unit includes an antenna that inserts into soil 206. Radar unit 204 emits electromagnetic radio waves into soil 206. As the waves travel through soil 206, portions of the waves are reflected back at different strengths depending on the composition of soil 206 and the presence and depths of objects within soil 206. Radar unit 204 is capable of detecting the presence and depth of rocks 208, soil water 209, buried delivery and/or drainage pipes 210, and any other objects within soil 206 based on reflected radio wave signatures (i.e., extrinsic characteristics). Radio waves transmitted by radar unit 204 are high-frequency waves. For example, the radio waves may have frequencies between 300 MHz and 3000 MHz or in excess of 3000 MHz. The utilization of high-frequency radio waves enables radar unit 204 to scan soil 206 at a high resolution such that it can detect soil characteristics (e.g., soil composition, soil density), the presence of soil water 209, the depth of the soil water 209, the amount of soil water 209, the presence and type of minerals present in soil 206, the presence and amount of humus in soil 206, and other soil characteristics (i.e., intrinsic characteristics). More detailed explanations of utilizing ground penetrating radar to detect soil characteristics can be found in "The Use of Ground-Penetrating Radar to Accurately Estimate Soil Depth in Rocky Forest Soils," by Sucre et al., "Soil Electromagnetic Mapping for Enhanced GPR Utility Location," by Thomas et al., and "Soil moisture content estimation using ground-penetrating radar reflection data," by Lunt et al., each of which are incorporated herein by reference in their entireties. Radar unit 204 may transmit unmodulated continuous-wave signals that are used to create a plan-view subsurface hologram of soil 206. In an alternate configuration, reflection seismology is used to transmit acoustic waves through soil 206, and reflected acoustic waves are analyzed to determine the composition of soil 206 and the location of objects within soil 206. Radar unit 204 provides feedback signals that include data pertaining to detected soil characteristics to controller 220 (as shown in FIG. 2B), where the data is processed into a three-dimensional map of soil 206.

Figure 2B:
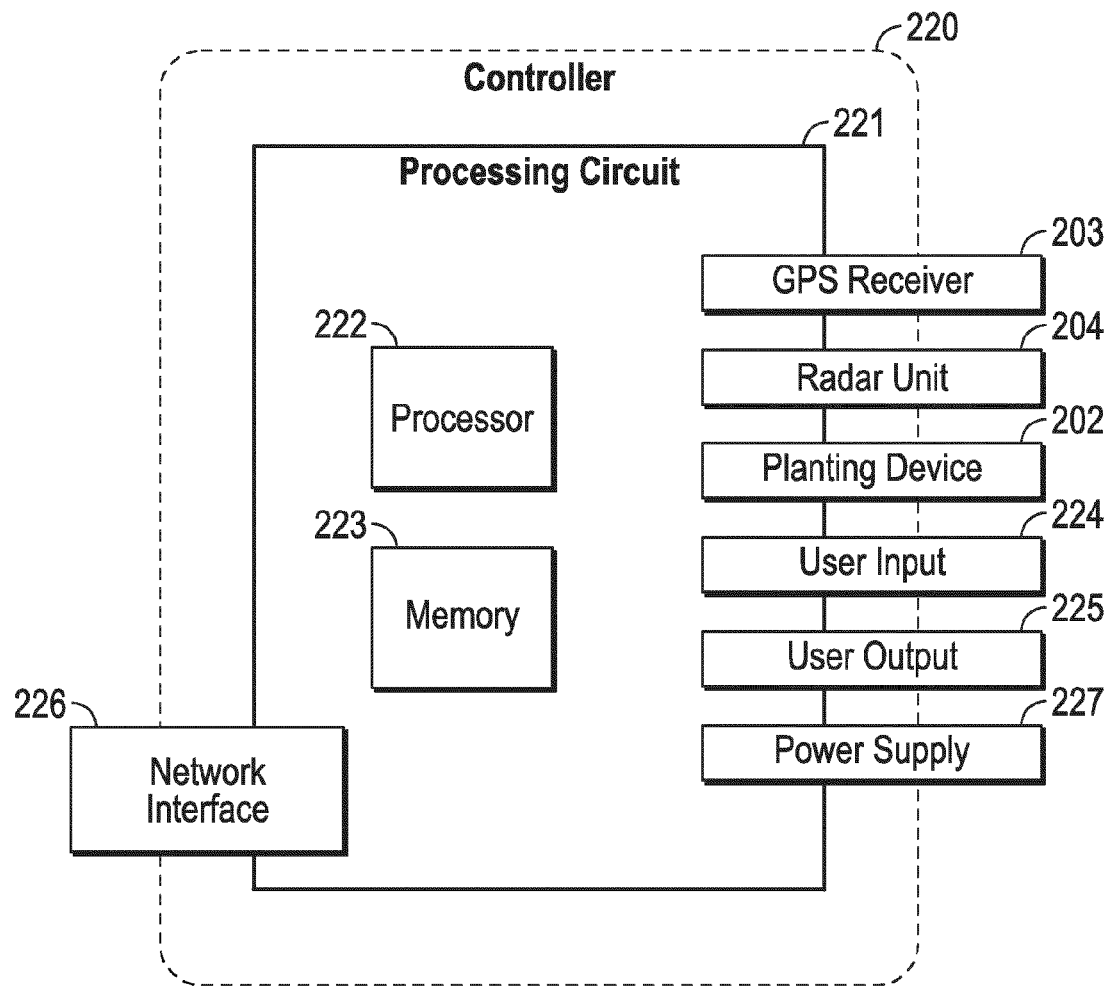
FIG. 2B is a block diagram of a controller of the soil detection and planting system.

Referring to FIG. 2B, a block diagram of controller 220 is shown. Controller 220 includes processing circuit 221. Processing circuit 221 includes processor 222 and memory 223. Processing circuit 221 communicates with GPS receiver 203, radar unit 204, planting device 202, user input 224, user output 225, and network interface 226. Controller 220 is powered by power supply 227. Memory 223 stores necessary programming modules that when executed by processor 222, control the operation of planting device 202 and the creation of the three-dimensional map of soil 206 based on settings, parameters, and feedback signals received through user input 224, GPS receiver 203, and radar unit 204. User input 224 is configured to provide an interface for a user to input desired operational parameters for system 200 (e.g., type of plant seed being placed, desired soil characteristics for planting, density of planting, etc.). User input 224 includes a series of knobs, wheels, multi-position switches, a keyboard, a mouse, or any combination thereof. User output 225 includes a display. User output 225 optionally includes audio output (e.g., for emitting beeps and tones) and/or indicator lights (e.g., LEDs for indicating system 200 statuses and alerts). It is contemplated that user input 224 and user output 225 are combined into a touch-screen display such that a user of system 200 can program desired settings and parameters through interaction with a graphical user interface presented on the display. Network interface 226 is configured to communicate with an external server or an external computing device. Network interface includes at least one of an Ethernet interface and a wireless transceiver (e.g., Bluetooth, 802.11, etc.). Power supply 227 provides power to controller 220. Power supply 227 may provide power to all components of system 200 (e.g., GPS receiver 203, radar unit 204, etc.). Power supply 227 may receive power from any suitable source (e.g., a rechargeable battery, a non-rechargeable battery, a generator onboard vehicle 201, an electronic alternator running off of the engine that powers vehicle 201, etc.).

Controller 220 is configured to process feedback signals from GPS receiver 203 and radar unit 204 based on provided operating parameters. As vehicle 201 moves along soil 206, and controller 220 receives feedback signals from radar unit 204 that indicates detected soil characteristics and GPS receiver 203 that indicate vehicle 201's location. Controller 220 processes these feedback signals into a detailed three-dimensional map of soil 206. The three-dimensional map includes location specific information pertaining to the composition of soil 206 (e.g., chemical composition, moisture amount, density, humus presence, etc.), the presence of objects (e.g., buried rocks, pipes, etc.), and other information pertaining to soil 206 up to a specified depth beneath the surface of soil 206. The depth parameter of the three-dimensional map (e.g., one foot beneath the surface, two feet beneath the surface, etc.) may be a user provided parameter. Controller 220 is configured to analyze feedback signals from radar unit 204 to locate and identify objects underneath the surface of soil 206 (e.g., rocks, soil water, delivery pipes, etc.). Detected objects are identified by their radar signatures. For example, radar waves reflected off of soil water will have a different signature than radar waves reflected off of rocks. Controller 220 automatically determines the identity of objects beneath the surface of soil 206. Alternatively, objects are manually identified and updated on the map through user input. For example, objects that cannot be automatically identified are marked as unknown on the map. The user then manually identifies the unknown objects (e.g., by taking a soil sample, by digging the object out of the soil, etc.). If the user removes the unknown object (e.g., a large rock is removed from beneath the surface of soil 206), the user may indicate that the object has been removed, and that it should be removed from the map. If the object remains in soil 206 (e.g., the object is a variation in soil composition), the user can identify the object on the map and the object's identity is stored. Alternatively, the user may choose to have the object remain unidentified.

As vehicle 201 moves along soil 206, controller 220 instructs planting device 202 to plant seeds into soil 206. Planting device 202 is capable of planting seeds at varying depths and densities. Based on user provided parameters and detected soil conditions, controller 220 instructs planting device 202 to deposit seeds at specific locations and at specific depths. For example, controller 220 may instruct planter 207 such that seeds are placed in desirable locations (e.g., nutrient rich locations, locations with soil water, locations within water percolation distance from underground irrigation systems, locations having subsurface materials placed for water retention, etc.) and are not placed in undesirable locations (e.g., locations with a high density of rocks, locations with little or no soil water, locations out of water percolation distance from underground irrigation systems, locations with insufficient soil depth, etc.). Planter 207 is further adjusted such that certain objects are not damaged (e.g., such that planter does not contact and damage pipe 210). Upon the successful placement of a seed by planting device 202, controller updates the map of soil 206 to indicate the placement of the seed (e.g., marks the map with an indication of the seed's placement). The created map may be exported to an external computing device via network interface 226, stored in memory 223, or stored on removable storage media (e.g., SD memory card, MicroSD memory card, USB flash memory, etc.). The user can then reference the created map after soil 206 has been mapped and/or after seeds have been planted.

Figure 3:
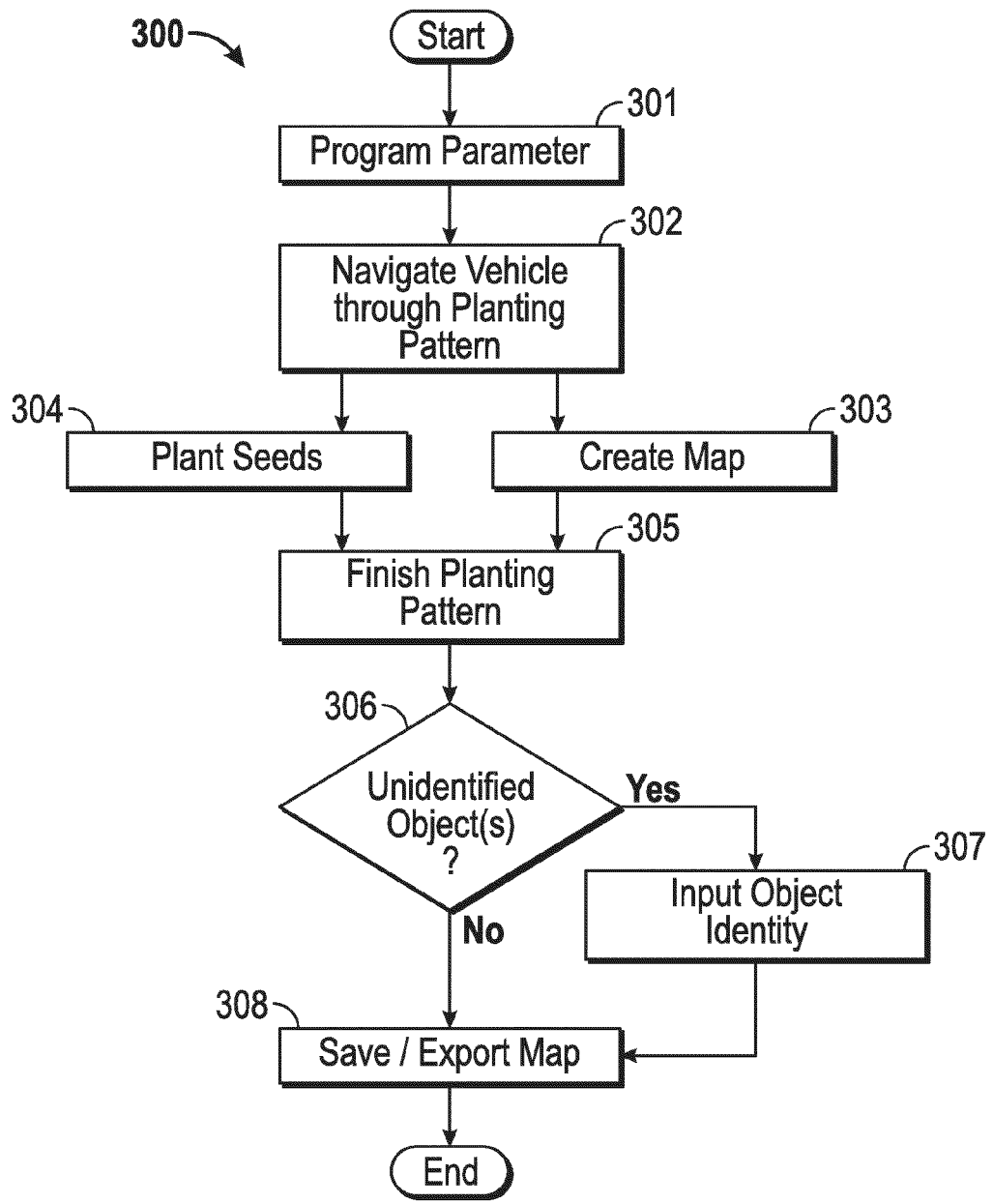
FIG. 3 is a flow diagram of a method of mapping soil characteristics and planting seeds according to an exemplary embodiment.

Referring to FIG. 3, a method of operating a system configured to plant seeds and create a map of an area planted based on detected soil characteristics (e.g., system 200) is shown according to an exemplary embodiment. The system includes a vehicle configured to map soil characteristics and plant seeds. The user programs operating parameters into the system (step 301). The operating parameters include planting parameters. The planting parameters include any of the type of plant seed being placed, desired seed placement characteristics (e.g., depth beneath the surface, proximity to water supply, soil composition), designated soil attributes to avoid or target (e.g., a threshold level of a detected substance to avoid, a threshold level of detected substance to plant in, etc.), seed placement density, future processing strategy (e.g., fertilizing strategy, watering strategy, target harvest date, etc.), and any other desired planting parameters. For example, a user may indicate that seeds are not to be placed in soil containing a threshold percentage of rocks, but that seeds are to be placed in soil containing a threshold level of soil water. Further, the user can indicate seeds are to be placed at designated detected locations (e.g., within percolation distance of irrigation systems, locations having subsurface materials placed for water retention, etc.) and are not to be placed in designated detected locations (e.g., on top of a buried pipe). The user can further provide a previously created map of the area to be planted to the system. The map includes a collection of data points coupled to location information, that when processed, may be reproduced into a visual representation of the map (e.g., for viewing by an operator through a display) or a set of data and location points for use by a system controller (e.g., to determine proper seed placement). The collected map data points may be stored in an R-tree data structure, an array data structure, or another suitable data structure. The map may be a three-dimensional map. The provided map includes information pertaining to the layout of the area to be planted and other information (e.g., the location of underground liquid delivery systems, the locations of buried rocks, the locations of previous seed locations, information pertaining to soil composition, etc.). The user provides the planting parameters to the system through a user input. The user input includes a series of knobs, wheels, multi-position switches, a keyboard, a mouse, a touchscreen display, or any combination thereof. A user can program planting parameters on an external computing device (e.g., a computer, a smartphone, a PDA, a tablet, etc.), and upload the planting parameters to the vehicle's controller. The upload may occur via an ad-hoc network connection between the vehicle's controller and the external computing device, by providing removable storage media (e.g., SD Card, USB flash drive, etc.), or by downloading the parameters from a host server.

In some instances, the vehicle may be at least partially autonomous and capable of navigating a predefined planting pattern based on location feedback from the on-board GPS sensor and computerized control of the vehicle's throttle and steering mechanisms. In such an arrangement, the user provided parameters include a detailed planting pattern over a designated area of land, such as a predefined vehicle path. The user provides the planting pattern by inputting a vehicle path overlay on a screen representing the area of land to be planted through a user input. Alternatively, the user may select a template vehicle path from a set of predefined vehicle path templates (e.g., a template corresponding to rows forming a rectangle, a template corresponding to rows forming a square, a template corresponding to rows forming a triangle, etc.). Upon selection of the vehicle path template, the system analyzes the selection, analyzes the land to be planted, and processes a suggested vehicle path according to the template and the specific land parameters (e.g., the size of the land, the presence of any trees, the presence of any lakes, etc.). The suggested path maximizes the number of plants to be planted with the designated pattern on the land to be planted. The suggested vehicle path is presented to the user for verification. The user can then accept, reject, or modify the suggested vehicle path (e.g., change a portion of the suggested vehicle path). If the user accepts or modifies the suggested vehicle path, the system begins autonomous operation of the vehicle by tracking the location of the vehicle through the GPS receiver and making steering and throttle adjustments such that the vehicle remains on the vehicle path.

Further referring to FIG. 3, the user then navigates the vehicle through the planting pattern (step 302). The vehicle path is displayed to the user such that the user can manually operate the vehicle to follow the path. Alternatively, if the vehicle is at least partially autonomous, the user instructs the vehicle to begin the planting and mapping process. As the vehicle follows the planting pattern, the vehicle is configured to detect soil characteristics and chart the detected soil characteristics on a map (step 303). The vehicle includes a soil-penetrating radar unit (e.g., an insertion radar unit or a non-insertion radar unit). The radar unit detects the presence and depth of rocks, soil water, buried materials (e.g., materials buried to help retain water in the soil), delivery and/or drainage pipes, and any other objects within the soil or on the surface of the soil (i.e., extrinsic soil characteristics). The radar unit emits radio waves having a high-frequency waves (e.g., frequencies between 300 MHz and 3000 MHz, frequencies in excess of 3000 MHz, etc.) into the soil. The radar unit utilizes reflected wave data to create a series of high resolution scans of the soil (e.g., depth slices, time slices, three-dimensional image blocks, etc.), and to detect changes in soil characteristics (e.g., soil composition, soil density), the presence of soil water, the depth of the soil water, the amount of soil water, the presence and type of minerals present in soil, the presence and amount of humus in soil, and other soil characteristics (i.e., intrinsic soil characteristics). In an alternate configuration, the radar unit transmits unmodulated continuous-wave signals that are used to create a plan-view subsurface hologram of soil. In another alternate configuration, reflection seismology may be used to transmit acoustic waves through soil, and reflected acoustic waves are analyzed to determine the composition of soil and the location of objects within soil. The radar unit provides feedback signals including data relating to the captured radar scans to the controller of the vehicle. While the radar unit scans the soil, a GPS receiver of the vehicle tracks the location of the vehicle and provides feedback signals to the controller indicating the location of the vehicle. The controller combines the radar scan information with information from the GPS receiver to create a map of the area traversed by the vehicle. The map created by the system is a collection of data points coupled to location information, that when processed, may be reproduced into a visual representation of the map (e.g., for viewing by an operator through a display) or a set of data and location points for use by a system controller (e.g., to properly determine plant or seed placement). The collected map data points may be stored in an R-tree data structure, an array data structure, or another suitable data structure. The map may be a three-dimensional map. The map has a high resolution such that a viewer or the vehicle can determine soil characteristics on a plant-by-plant basis (i.e., soil characteristics are charted at the location of each plant or seed placement) or on a sub-plant spacing basis (i.e., soil characteristics are charted even where no plants or seeds are to be planted).

As the vehicle navigates along the vehicle path, the vehicle plants seeds according to the programmed parameters (step 304). The controller of the vehicle sends instructions to a planting mechanism of the vehicle. The controller instructs the planting mechanism to place seeds on an individual seed basis (e.g., one-by-one) at designated locations. The designated locations are determined based on at least one of feedback received from the radar unit and the user provided planting parameters. The user may indicate that seeds are to be placed along the designated planting pattern regardless of detected soil characteristics. Alternatively, a user indicates that seeds are to be placed along a designated planting pattern only if satisfactory soil characteristics are detected. For example, a user may indicate that the controller is to instruct seed placement in soil containing a threshold level of nutrients, a threshold level of soil water, within a percolation distance of an irrigation system, at locations including subsurface materials placed for water retention, etc. In yet another alternative embodiment, a user indicates that seeds are to be placed along a designated planting pattern unless unsatisfactory soil characteristics are detected. For example, the user may not wish to place seeds in soil containing a threshold amount of rocks, in soil out of the percolation distance of an irrigation system, in soil lacking appropriate levels of minerals or humus, etc. The controller further instructs the planting mechanism to place the seeds according to a specified depth. The depth is set by the user as part of the provided parameters (provided in step 301). Alternatively, the controller may automatically adjust depth based on the type of seed being planted and/or the detected characteristics of the soil. The depth may be adjusted to avoid incidental contact an damage with equipment on the farm land, to avoid placement of seeds in undesirable areas, or to target certain depths to plant seeds within desirable areas (e.g., to avoid groupings of rocks, to avoid irrigation pipes, to target areas of soil water, etc.). Each seed's placement is individually charted on the map, or groupings of seeds are marked as being planted in a planting pattern on the map (e.g., the controller places an indication on the map pertaining to the location of a row of corn seeds).

After placement of the seeds is complete, the user indicates to the controller of the vehicle that the planting pattern is finished (step 305). Alternatively, if the vehicle is at least partially autonomous, the vehicle indicates to the user that the pattern is complete. The user is then alerted to the presence of any unidentified objects detected within the soil (step 306). The controller of the vehicle is configured to analyze and identify objects beneath the surface of the soil based on the objects' radar signatures. In some situations, the controller may not be able to determine an object's identity. Accordingly, the controller alerts the user of the unidentified object's presence through a user output mechanism (e.g., a display) of the vehicle. The user can then input the identity of the object such that the object is marked and noted on the map through a user input mechanism of the vehicle (step 307). Alternatively, the user can ignore the alert and the object will remain on the map as unidentified or delete the unidentified object (e.g., if the user locates and removes the object from the soil). If no unidentified objects are detected, step 307 is skipped.

After any unidentified objects are identified or removed, the map may be saved and exported (step 308). The created map indicating the detected soil characteristics and plant seed placement is stored in memory associated with the controller of the system. The created map may be exported to an external computing device via a network interface or stored on removable storage media (e.g., SD memory card, MicroSD memory card, USB flash memory, etc.). The user can then access the map on an external computing device. For example, the map may be beneficial for predicting future harvest yields, for identifying areas of soil that require additional irrigation or fertilization, for identifying areas of soil containing an abnormal amount of undesirable characteristics that need to be fixed (e.g., rocks that need to be removed), and for use in future planting seasons.

Figure 4A:
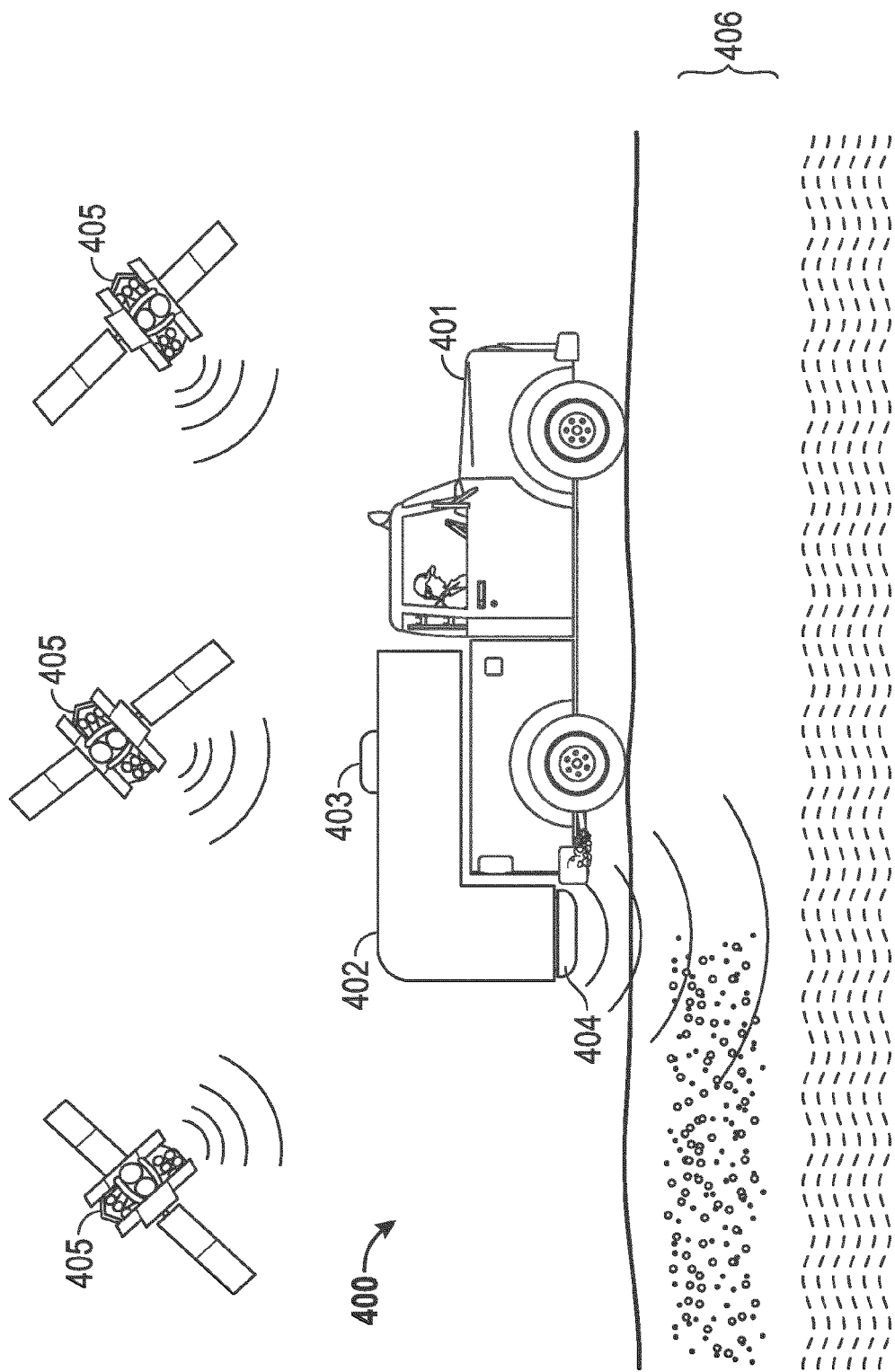
FIG. 4A is a stand-alone soil detection and mapping system according to an exemplary embodiment.

Referring to FIG. 4A, a stand-alone mapping system 400 is shown according to an exemplary embodiment. System 400 includes vehicle 401 (shown as a pickup truck) and mapping unit 402. Mapping unit 402 is an attachment to vehicle 401 (e.g., configured to fit into a bed of a pickup truck, towed by another vehicle, etc.). Although mapping unit 402 is shown as an attachment to vehicle 401, it should be understood that a mapping unit 402 may be fully integrated into a vehicle. Mapping unit 402 includes GPS receiver 403 and a soil sensor, shown as ground penetrating radar unit 404 coupled to the housing of mapping unit 402. GPS receiver 403 receives signals from GPS satellites 405 and is configured to provide a feedback signal used to track the location of vehicle mapping unit 402. In alternative embodiments, other location sensors can be employed instead of, or in conjunction with, GPS. For instance, mapping unit 402 can include inertial navigation equipment, which is initialized with respect to a field reference site, and which may be updated during the mapping/planting session. In another embodiment, mapping unit 402 can interact with a local metrology system, e.g., RF or, optical navigation beacons set up in the vicinity of the field being traversed. Radar unit 404 utilizes ground penetrating radar to determine intrinsic and extrinsic characteristics of soil 406. Radar unit 404 is similar to radar unit 204 of system 200. Accordingly, radar unit 404 is a non-insertion soil-penetrating radar unit or an insertion radar unit and emits radar waves into soil 406. As the waves travel through soil 406, portions of the waves reflect back at different strengths depending on the composition of soil 406 and the presence and depths of objects within soil 406. Radar unit 404 is capable of detecting the presence and depth of objects and characteristics of soil 406. Radio waves transmitted by radar unit 404 are high-frequency waves (e.g., radio waves having frequencies between 300 MHz and 3000 MHz, radio waves having frequencies in excess of 3000 MHz, etc.). Radar unit 404 may transmit unmodulated continuous-wave signals that are used to create a plan-view subsurface hologram of soil 406. In another alternate configuration, reflection seismology is used to transmit acoustic waves through soil 406, and reflected acoustic waves are analyzed to determine the composition of soil 406 and the location of objects within soil 406. Radar unit 403 provides feedback signals that include data pertaining to the detected soil characteristics to controller 410 (shown in FIG. 4B). Mapping unit 402 is generally configured to detect characteristics of soil 406 through radar unit 404 and generate a map of soil 406 by pairing location data from GPS receiver 403 with soil characteristic data from radar unit 404. The map created by system 400 is a collection of data points coupled to location information, that when processed, may be reproduced into a visual representation of the map (e.g., for viewing by an operator through a display) or a set of data and location points for use by another system (e.g., to determine proper plant or seed placement). The collected map data points may be stored in an R-tree data structure, an array data structure, or another suitable data structure. The map may be a three-dimensional map.

Figure 4B:
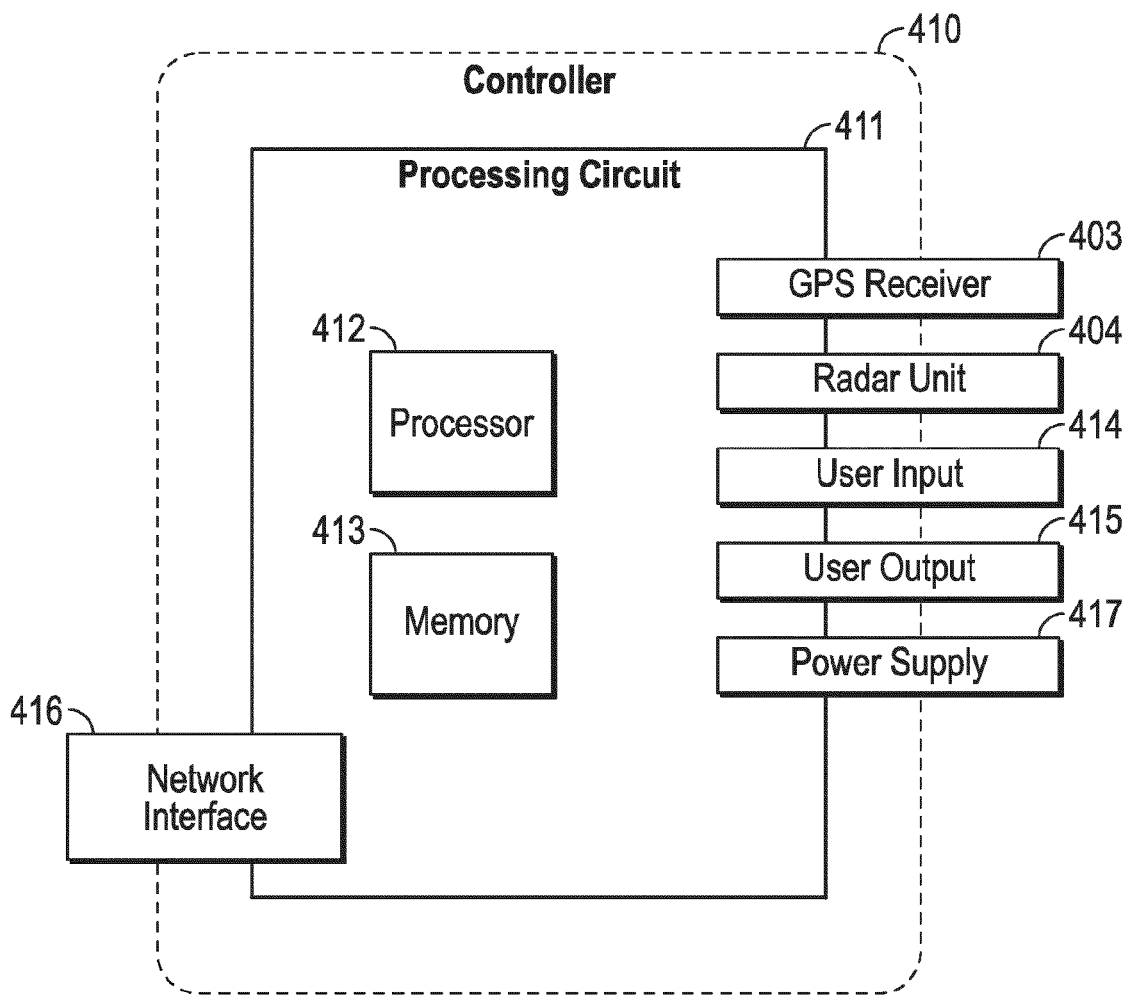
FIG. 4B is a block diagram of a controller of the stand-alone soil detection and mapping system.

Referring to FIG. 4B, a block diagram of controller 410 is shown in accordance with an exemplary embodiment. Controller 410 controls the operation of mapping unit 402. Controller 410 includes processing circuit 411. Processing circuit 411 includes processor 412 and memory 413. Processing circuit 411 communicates with GPS receiver 403, radar unit 404, user input 414, user output 415, and network interface 416. Controller 410 is powered by power supply 417. Memory 413 stores necessary programming modules that when executed by processor 412, control the operation of mapping unit 402 and the creation of a three-dimensional map of soil 406 based on settings, parameters, and feedback received through user input 414, GPS receiver 403, and radar unit 404. User input 414 is configured to provide an interface for a user to input desired mapping parameters for system 400 (e.g., size of area to be mapped, type of soil to be mapped, sensitivity level of radar unit 404, etc.). User input 414 includes a series of knobs, wheels, multi-position switches, a keyboard, a mouse, or any combination thereof.

User output 415 includes a display. User output 415 optionally includes audio output (e.g., for emitting beeps and tones) and indicator lights (e.g., LEDs for indicating system 400 statuses and alerts). It is contemplated that user input 414 and user output 415 are combined into a touchscreen display that displays an interactive graphical user interface such that a user of system 400 can program desired settings and parameters through interaction with the display. Network interface 416 is configured to communicate with an external server or an external computing device. Network interface includes at least one of an Ethernet interface and a wireless transceiver (e.g., Bluetooth, 802.11, etc.). An external computing device remote from controller 410 can provide an interface for a user to input desired mapping parameters for system 400 and to control system 400 (e.g., a portable computing device located in the passenger compartment of vehicle 401). In this arrangement, the external computing device transmits user provided input to controller 410 through network interface 416 and receives system 400 output transmitted by network interface 416. Power supply 417 may receive power from any suitable source (e.g., a rechargeable battery, a non-rechargeable battery, a generator onboard vehicle 401, an electronic alternator running off of the engine that powers vehicle 401). Power supply 417 may provide operational power to all components of mapping unit 402, including GPS receiver 403, radar unit 404, user input 414, and user output 415.

As in system 200, controller 410 of system 400 is configured to process feedback signals from GPS receiver 403 and radar unit 404 into a detailed map of soil 406. As vehicle 401 moves along soil 406, controller 410 receives feedback signals from radar unit 404 that indicate characteristics of soil 406 and GPS receiver 403 that indicate the location of vehicle 401. Controller 410 is configured to process these feedback signals into a detailed three-dimensional map of soil 406. The three-dimensional map includes location specific information pertaining to the composition of soil 406 (e.g., chemical composition, moisture amount, density, humus presence, etc.), the presence of objects (e.g., buried rocks, pipes, etc.), and other information pertaining to soil 406 up to a specified depth beneath the surface of soil 406. The depth parameter of the three-dimensional map (e.g., one foot beneath the surface, two feet beneath the surface, etc.) may be a user provided parameter. Controller 410 is configured to analyze feedback signals from radar unit 404 to locate and identify objects underneath the surface of soil 406 (e.g., rocks, soil water, delivery pipes, etc.). Detected objects are identified by radar signatures. Controller 410 is configured to automatically determine the identity of objects beneath the surface of soil 406. Alternatively, objects are manually identified and updated on the map through user interaction. For example, controller 410 may not be able to ascertain the identity of a detected object or characteristic. Accordingly, the user may be alerted of an unidentified object's location such that the user can manually identify the object, clear the object from the map, or leave the object as unidentified on the map. The created map can be exported to an external computing device via network interface 416 or be stored on removable storage media (e.g., SD memory card, MicroSD memory card, USB flash memory, etc.). The user can then reference the created map for assistance during future soil processing operations (e.g., planting, harvesting, tilling, object extraction, etc.).

Figure 4C:
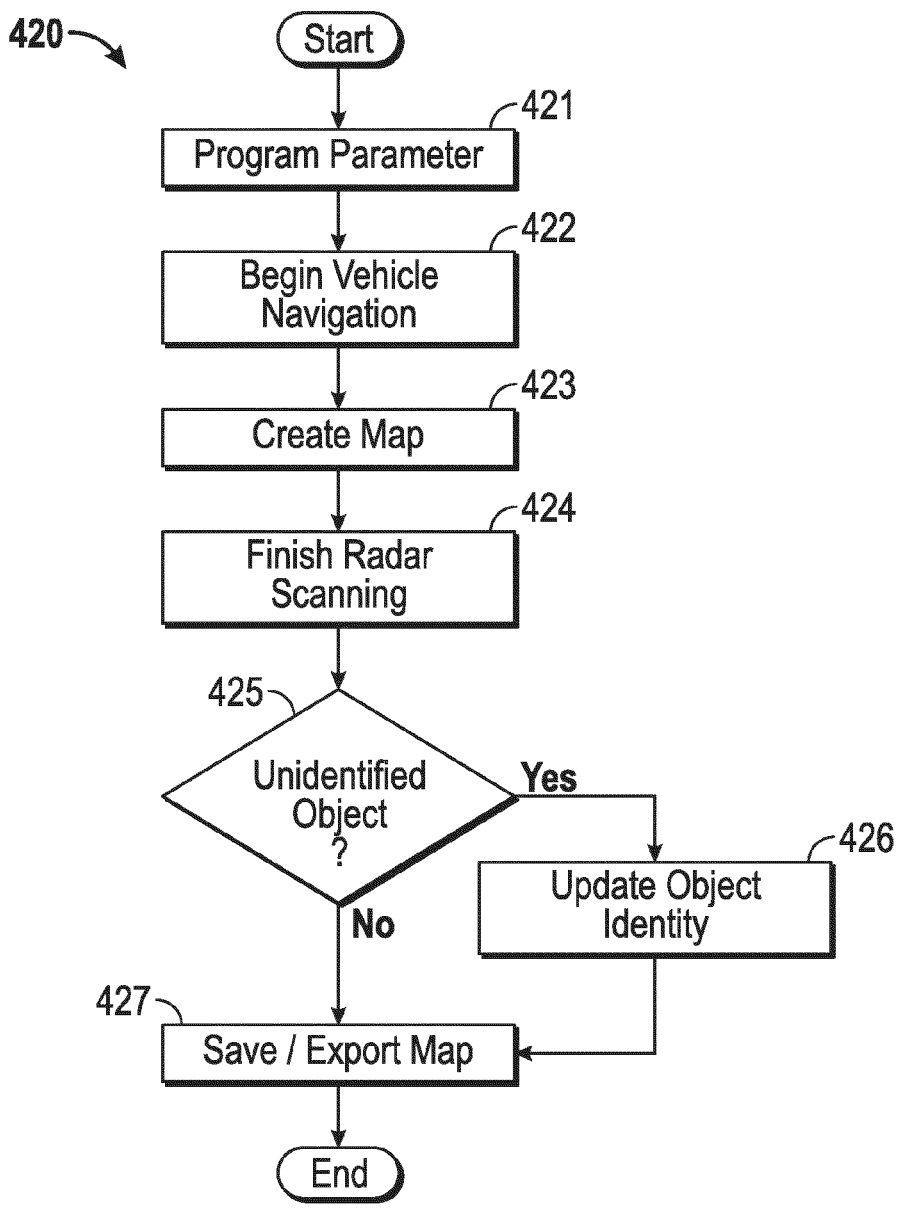
FIG. 4C is a flow diagram of a method of mapping soil characteristics according to an exemplary embodiment.

Referring to FIG. 4C, a method 420 of operating a stand-alone soil mapping system (e.g., system 400) is shown. The user programs operating parameters into the system (step 421). The operating parameters may include a desired map depth (e.g., a designated number of feet or meters beneath the surface of the soil) and a map resolution indication. In certain situations, it is desirable to have a high resolution map created (e.g., a map indicating detected objects and soil characteristic variances for every inch of lateral or vertical travel). For example, a high resolution map is desirable if the map will be used in a precision planting operation that requires precise location information for detected intrinsic and extrinsic soil characteristics. If a high resolution is desired, the radar unit of the system utilizes high-frequency radio waves during the mapping process (e.g., in excess of 1000 MHz). In other situations, it may be desirable to have a low resolution map created (e.g., a map indicating the presence and location of large objects beneath the surface of the soil, but not other soil characteristics such as soil composition). For example, a low resolution map may be desirable if the map will only be needed to identify large objects located under the soil's surface. If a low resolution is desired, the radar unit of the system utilizes low-frequency radio waves during the mapping process (e.g., less than 1000 MHz). In some configurations, the vehicle is at least partially autonomous and is capable of navigating a predefined mapping pattern based on location feedback from the on-board GPS sensor and computerized control of the vehicle's throttle and steering mechanisms. The operating parameters may include a detailed mapping pattern over a designated area of land, such as a predefined vehicle path. The user may provide the mapping pattern by drawing a vehicle path overlay on a screen representing the area of land to be mapped. Alternatively, the user may select a plot of land from a mapping service (e.g., MapQuest, Google Maps, etc.), and the controller of the system automatically computes a suggested vehicle path for complete mapping of the plot of land. The suggested vehicle path is presented to the user for verification. The user can then accept, reject, or modify (e.g., change a portion of the suggested vehicle path) the suggested vehicle path. If the user accepts or modifies the suggested vehicle path, the system is ready to begin autonomous operation of the vehicle by tracking the location of the vehicle through the GPS receiver and making steering and throttle adjustments such that the vehicle remains on the vehicle path.

The user begins navigating the vehicle over the area of land to be mapped (e.g., by following the suggested vehicle path) (step 422). Alternatively, if the vehicle is at least partially autonomous, the user instructs the vehicle to begin the mapping process. As the vehicle follows the mapping pattern, the vehicle is configured to detect soil characteristics and chart the detected soil characteristics on a map (step 423). The vehicle includes a soil-penetrating radar unit. The radar unit is an insertion radar unit or a non-insertion radar unit. The radar unit detects the presence and depth of rocks, soil water, buried delivery and/or drainage pipes, and any other objects within the soil. The radar unit emits high-frequency radio waves (e.g., frequencies between 300 MHz and 3000 MHz, frequencies in excess of 3000 MHz, etc.) into the soil. The radar unit captures a series of high resolution scans of the soil (e.g., depth slices, time slices, three-dimensional image blocks, etc.), and to detect soil characteristics (e.g., soil composition, soil density), the presence of soil water, the depth of the soil water, the amount of soil water, the presence and type of minerals present in soil, the presence and amount of humus in soil, and other soil characteristics. In an alternate configuration, the radar unit transmits unmodulated continuous-wave signals that are used to create a plan-view subsurface hologram of soil. In another alternate configuration, reflection seismology is used to transmit acoustic waves through soil, and reflected acoustic waves are analyzed to determine the composition of soil and the location of objects within soil. The radar unit provides feedback signals data relating to captured radar scans to the controller of the vehicle. The controller combines the radar scan information with information from the GPS receiver to create a dimensional map of the area traversed by the vehicle. The map created by the system is a collection of data points coupled to location information, that when processed, may be reproduced into a visual representation of the map (e.g., for viewing by an operator through a display) or a set of data and location points for use by a system controller in further processing (e.g., the controller of a system may process the map data to instruct plant or seed placement). The collected map data points may be stored in an R-tree data structure, an array data structure, or another suitable data structure. The map may be a three-dimensional map.

Further referring to FIG. 4C, the user indicates to the vehicle that the soil to be mapped has been mapped and stops the mapping process (step 424). Alternatively, in the case of an at least partially autonomous vehicle, the vehicle indicates to the user that the pattern is complete. Upon completion, the user is alerted to the presence of any unidentified objects detected within the soil (step 425). The controller of the vehicle is configured to analyze and identify objects beneath the surface of the soil based on the objects' radar signatures. The controller may not be able to determine every detected object's identity. Accordingly, the controller alerts the user of the vehicle to any unidentified object's presence. The user can then input the identity of the object such that the object is marked and noted on the map (step 426). Alternatively, the user can ignore the alert (i.e., the object remains on the map as an unidentified object) or deletes the unidentified object from the map. If no unidentified objects are detected, step 425 is skipped.

After the unidentified objects are identified, ignored, or removed, the map is saved and exported (step 427). The created map indicating the detected soil characteristics is stored in memory associated with the controller of the system. The user may wish to save the map for later viewing and analysis. For example, the map may be beneficial for plotting future planting operations, for identifying areas of soil that require additional irrigation or fertilization, and for identifying areas of soil containing an abnormal amount of undesirable characteristics that need to be fixed (e.g., rocks that need to be removed). Accordingly, the created map can be exported to an external computing device via a network interface or can be stored on removable storage media (e.g., SD memory card, MicroSD memory card, USB flash memory, etc.).

Figure 5A:
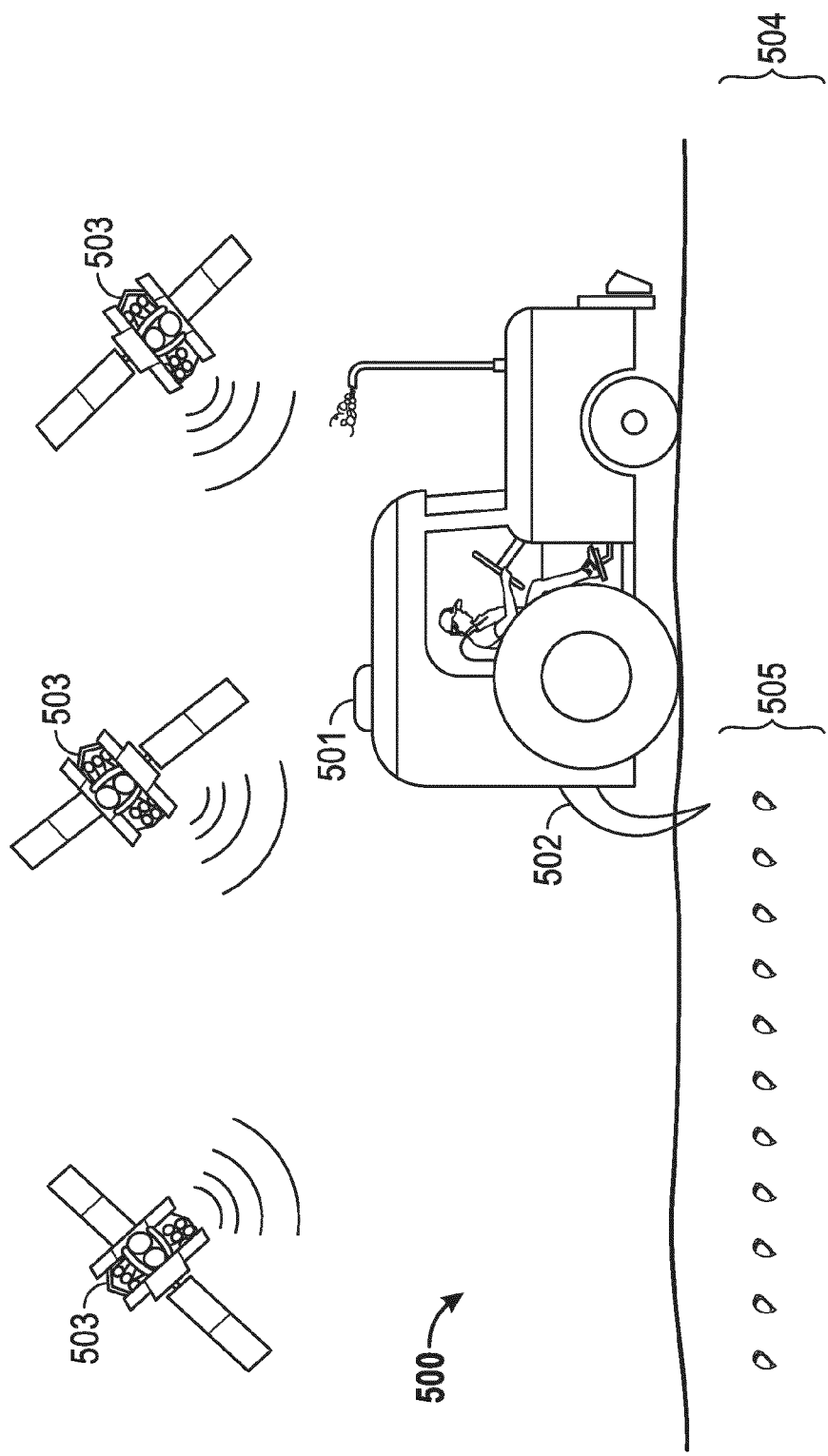
FIG. 5A is a stand-alone planting system according to an exemplary embodiment.

Referring to FIG. 5A, a stand-alone precision planting vehicle 500 is shown in accordance with an exemplary embodiment. Vehicle 500 includes GPS receiver 501 and planting device 502. GPS receiver 501 receives signals from GPS satellites 503 and is configured to provide a feedback signal used to track the location of vehicle 500. Planting device 502 is configured to dig a hole or a trench in soil 504, place seeds 505, and cover the seeds with displaced soil material. Planting device 502 is depth adjustable such that seeds can be buried at different depths within soil 504. Planting device 502 is controllable such that seeds can be placed at various densities (e.g., at a designated number of seeds per area planted, on a seed-by-seed basis, etc.). Vehicle 500 is generally configured to precisely plant seeds 505 based on location data received from GPS receiver 501, provided planting parameters and soil characteristic data received from a provided map of soil 504. The provided map is a collection of data points coupled to location information, that when processed, may be reproduced into a visual representation of the map (e.g., for viewing by an operator through a display) or a set of data and location points for further processing (e.g., the map data may be processed to determine proper seed placement). The collected map data points may be stored in an R-tree data structure, an array data structure, or another suitable data structure. The map may be a three-dimensional map.

Figure 5B:
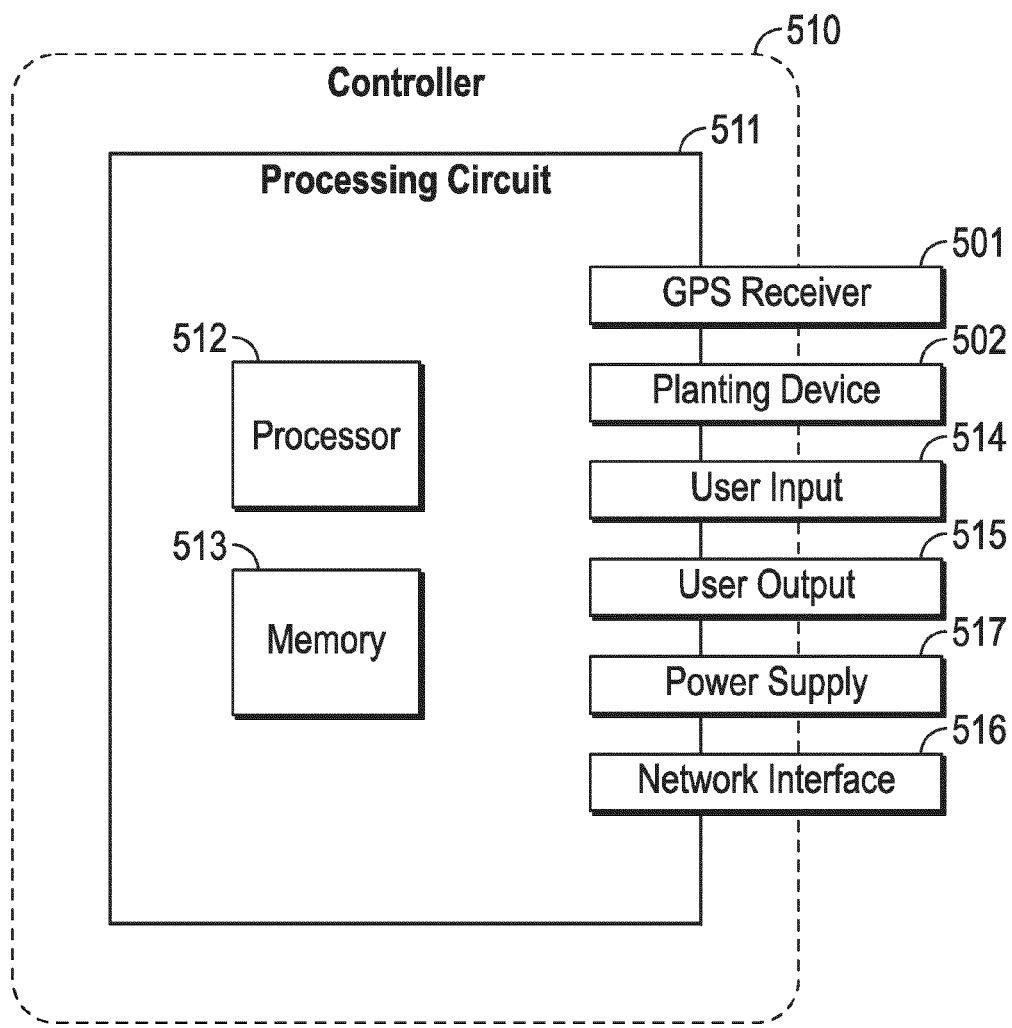
FIG. 5B is a block diagram of a controller of the stand-alone planting system.

Referring to FIG. 5B, a block diagram of controller 510 is shown. Controller 510 generally controls the operation of vehicle 500. Controller 510 includes processing circuit 511. Processing circuit 511 includes processor 512 and memory 513. Processing circuit 511 communicates with GPS receiver 501, planting device 502, user input 514, user output 515, and network interface 516. Controller 510 is powered by power supply 517. Memory 513 stores necessary programming modules that when executed by processor 512, control the operation of vehicle 500, including the operation of planting device 502, receiving user input, providing user output, communications over network interface 516, and updating any provided map data. User input 514 is configured to provide an interface for a user to input desired planting parameters for vehicle 500 (e.g., type of plant seed being placed, desired soil characteristics for planting, density of planting, planting pattern, etc.). User input 514 includes a series of knobs, wheels, multi-position switches, a keyboard, a mouse, or any combination thereof. User output 515 includes a display. User output 515 optionally includes audio output (e.g., for emitting beeps and tones) and/or indicator lights (e.g., LEDs for indicating vehicle 500 statuses and alerts). It is contemplated that user input 514 and user output 515 are combined into a touchscreen display such that a user of vehicle 500 can program desired settings and parameters through interaction with a graphical user interface presented on the display. Network interface 516 is configured to communicate with an external server or an external computing device. Network interface 516 includes at least one of an Ethernet interface and a wireless transceiver (e.g., Bluetooth, 802.11, etc.). Power supply 517 provides power to controller 510. Power supply 517 may provide power to all components of vehicle 500 (e.g., GPS receiver 501, planting device 502, etc.). Power supply 517 may receive power from any suitable source (e.g., a rechargeable battery, a non-rechargeable battery, a generator onboard vehicle 500, an electronic alternator running off of the engine that powers vehicle 500, etc.).

Controller 510 instructs planting device 502 to place seeds in soil 504 based on processed feedback signals from GPS receiver 501 and provided planting parameters. As vehicle 500 moves along soil 504, controller processes location feedback signals from GPS receiver 501 to track the location of vehicle 500. Controller 510 compares the location of vehicle 500 to provided map data. The map data pertains to a three-dimensional map of soil 504 including location specific information pertaining to the composition of soil 504, (e.g., chemical composition, moisture amount, density, humus presence, etc.), the presence of objects (e.g., buried rocks, pipes, etc.), and other information pertaining to soil 504 up to a certain depth beneath the surface of soil 206. The map data may have been initially created through the use of a soil mapping system (e.g., system 400). The map is received into memory 513 from an external computing device or server through network interface 516 or from removable storage media (e.g., SD memory card, MicroSD memory card, USB flash memory, etc.) provided by the user.

As vehicle 500 moves along soil 504, controller 510 instructs planting device 502 to plant seeds 505 into soil 504 at specific locations based on provided planting parameters and soil conditions contained within map data. For example, controller 510 is configured to adjust planting device 502 such that seeds are placed in desirable locations (e.g., nutrient rich locations, locations with soil water, locations within water percolation distance from underground irrigation systems, locations having subsurface materials placed for water retention, etc.) and are not placed in undesirable locations (e.g., locations with a high density of rocks, locations with little or no soil water, locations out of water percolation distance from underground irrigation systems, etc.). Additionally, planting device 502 is adjusted such that any desirable underground objects (e.g., buried irrigation pipes) are not damaged. Upon the successful placement of a seed by planting device 502, controller 510 updates the map of soil 504 to indicate the placement of the seed. The modified map may be saved and exported to an external computing device via network interface 516 or stored on removable storage media (e.g., SD memory card, MicroSD memory card, USB flash memory, etc.).

Figure 5C:
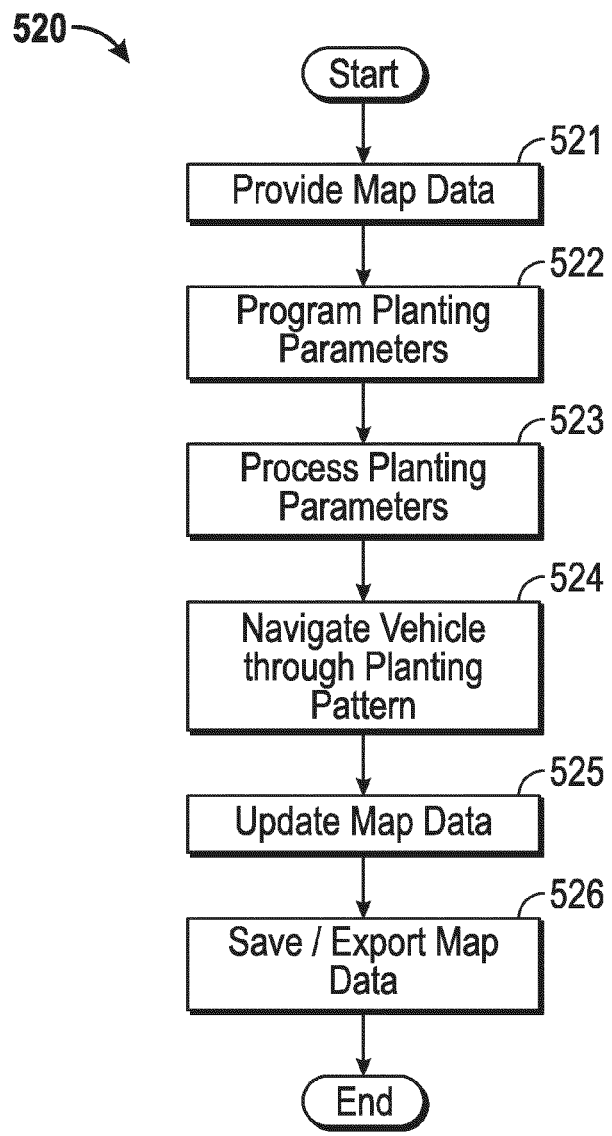
FIG. 5C is a flow diagram of a method of planting seeds according to an exemplary embodiment.

Referring to FIG. 5C, a method 520 of precision planting through a planting system (e.g., vehicle 500) based on provided planting parameters and map data. The user of the system provides map data pertaining to an area of soil to be planted (step 521). The map data relates to a three-dimensional map of an area of soil to be planted and includes location specific information pertaining to the composition of the soil, (e.g., chemical composition, moisture composition, density, humus presence, etc.), the presence of objects (e.g., buried rocks, pipes, etc.), and any other information pertaining to soil. The map includes this information up to a specified depth beneath the surface of the soil. The map data is a collection of data points coupled to location information, that when processed, may be reproduced into a visual representation of the map (e.g., for viewing by an operator through a display) or further processed by a controller of the system (e.g., to determine proper seed placement). The collected map data points may be stored in an R-tree data structure, an array data structure, or another suitable data structure. The map may be a three-dimensional map. The map data may have been created through the use of a soil mapping system (e.g., system 400). The map data is provided to a controller of the system from an external computing device or server through network interface of the controller or with a removable storage media (e.g., SD memory card, MicroSD memory card, USB flash memory, etc.).

The user programs planting parameters to the precision planting vehicle (step 522). The planting parameters include any of the type of plant seed being placed, desired placement characteristics (e.g., depth beneath the surface, proximity to water supply, soil composition), seed placement density, future processing strategy (e.g., fertilizing strategy, watering strategy, target harvest date, etc.), seed placement strategy (e.g., rows, circles, etc.), and any other desired planting parameter. The planting parameters may include threshold levels of detected soil characteristics to avoid planting seeds. For example, a user may indicate that seeds are not to be placed in soil containing a threshold percentage or number of rocks. Further, the planting parameters may include threshold levels of detected soil characteristics for seed placement. For example, a user may indicate that seeds are to be placed in soil containing a threshold level of soil water. Further, the user can indicate seeds are to be placed at designated detected locations (e.g., within percolation distance of irrigation systems, locations having subsurface materials placed for water retention,) and are not to be placed in designated detected locations (e.g., on top of a buried pipe). The planting parameters may include a subset of the provided map data indicating that only a portion is to be planted. The user provides the planting parameters to the system through a user input. The user input includes a series of knobs, wheels, multi-position switches, a keyboard, a mouse, a touchscreen display, or any combination thereof. Alternatively, a user programs planting parameters on an external computing device (e.g., a computer, a smartphone, a PDA, a tablet, etc.) and uploads the planting parameters to the controller. The upload may occur via an ad-hoc network connection between the controller and the external computing device, via removable storage media (e.g., SD Card, USB flash drive, etc.), or via downloading the parameters from a host server. Further, the system may automatically determine planting parameters based on a user selection of a planting parameter template (e.g., corn rows) and a designated an area of land to be planted. The template includes preset planting parameters (e.g., type seed, seed placement depth, proximity to water supply information, desired soil composition, seed placement density, seed placement strategy, etc.). The user can modify the preset planting parameters of the template.

The controller of the system then processes a planting pattern (step 523). The planting pattern is created through processing of the provided planting parameters and provided map data. The controller of the system determines where seeds should be placed according to the planting parameters (e.g., in rows, in areas having high nutrient counts, within percolation distance from a water supply, etc.). The planting pattern maximizes the number of plants or seeds to be planted with the designated pattern on the land to be planted. The controller determines a vehicle path to accomplish the planting pattern. The vehicle path minimizes distance traveled by the vehicle and/or planting time. In some instances, the planting vehicle may be at least partially autonomous and capable of navigating a predefined planting pattern based on location feedback from the on-board GPS sensor and computerized control of the vehicle's throttle and steering mechanisms. Accordingly, the user may provide vehicle operating parameters (e.g., maximum speed) and the controller's processed vehicle path includes vehicle operating instructions (e.g., speeds, where to turn, etc.). In such an arrangement, the controller's processed vehicle path is presented to the user prior to operation such that the user can accept, reject, or modify the suggested vehicle path. For example, the user may wish to avoid planting in certain areas and modify the suggested vehicle path accordingly. Alternatively, the user may provide a specified planting pattern and vehicle path during step 522 (e.g., by drawing a vehicle path over the provided map data via a user input and by indicating where seeds are to be placed or how controller is to determine where seeds are to be placed).

Further referring to FIG. 5C, the user navigates the vehicle through the planting pattern (step 524). The user is presented the processed planting pattern and vehicle path on a display screen of the vehicle. The user operates the vehicle such that the vehicle approximately traces the path displayed on the screen of the vehicle. If the vehicle is at least partially autonomous, the user instructs the vehicle to begin the planting process. In either case, as the vehicle follows the planting pattern, the vehicle is configured to plant seeds in the soil according to the processed planting pattern. The controller of the planting system communicates with a planting mechanism of the vehicle and instructs the planting mechanism to place seeds when the vehicle's determined location matches a location of the map data where a seed is to be placed. The vehicle's location is determined based on feedback received from a location sensor (e.g., a GPS receiver). The controller is further configured to adjust parameters of the planting mechanism (e.g., the seed placement depth, the seed placement density, etc.) based on the processed planting pattern. As seeds are placed into the soil, the map data is updated to include the location of the seed (step 525)

After the planting pattern is completed, the updated map may be saved to memory of the controller of the vehicle and exported (step 526). The updated map data includes previously detected soil characteristics and plant seed placement. The map data may be used for future soil processing (e.g., fertilization, watering, harvesting, tilling, etc.). Accordingly, the updated map data may be exported to an external computing device via a network interface of the controller or can be stored on removable storage media (e.g., SD memory card, MicroSD memory card, USB flash memory, etc.). The user can then access the map on an external computing device.

Figure 6A:
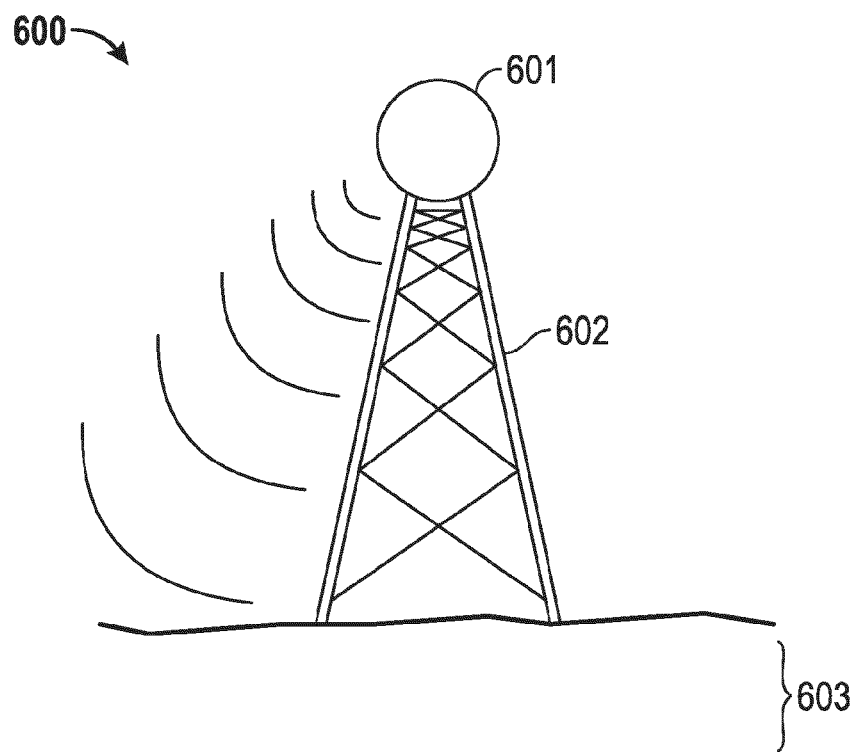
FIG. 6A is a stationary soil characteristic detection system according to an exemplary embodiment.

Ground mapping systems are not limited to vehicle based systems (e.g., system 200 and system 400). Referring to FIG. 6A, a stationary ground penetrating radar system 600 is shown in accordance with an exemplary embodiment. System 600 includes radar unit 601 mounted on tower 602. Radar unit 601 is configured to detect intrinsic and extrinsic characteristics of soil 603 in a similar manner as radar unit 203 of system 200 and radar unit 404 of system 400. Accordingly, radar unit 601 utilizes ground penetrating radar to determine characteristics of soil 603. As transmitted radar waves travel through soil 603, portions of the wave are reflected back at different strengths depending on the composition of soil 603 and the presence and depths of objects within soil 603. The radio waves have frequencies between 300 MHz and 3000 MHz or in excess of 3000 MHz. System 600 can detect changes in soil characteristics (e.g., soil composition, soil density), the presence of soil water, the depth of the soil water, the amount of soil water, the presence and type of minerals present in soil 603, the presence and amount of humus in soil 603, and other soil characteristics. In an alternate configuration, radar unit 601 transmits unmodulated continuous-wave signals that are used to create a plan-view subsurface hologram of soil 603. In another alternate configuration, reflection seismology is used to transmit acoustic waves through soil 603, and reflected acoustic waves are analyzed to determine the composition of soil 603 and the location of objects within soil 603. Feedback signals from radar unit 601 are provided to a controller similar to controller including a processing circuit having a processor and memory (similar to controller 220 and controller 410).

Figure 6B:
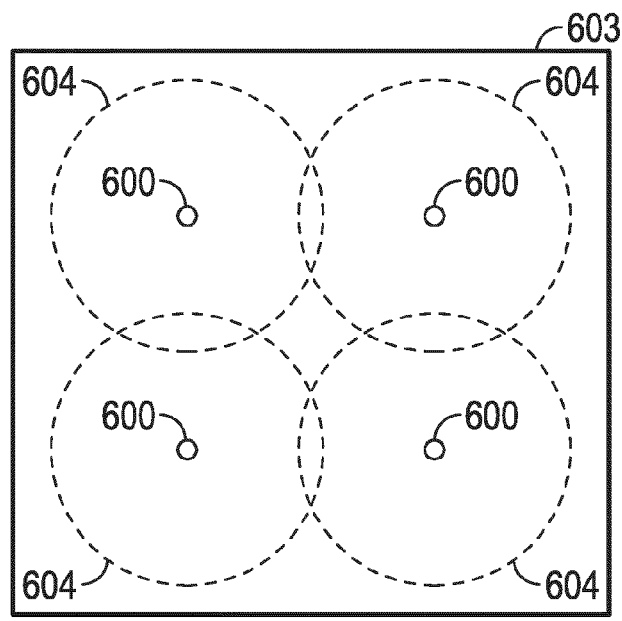
FIG. 6B is a schematic view of a system of stationary soil characteristic detection systems.

Radar unit 601 of system 600 is stationary, and therefore has a limited and relatively static area of detection (see circles 604 of FIG. 6B). Referring to FIG. 6B, an exemplary layout of soil 603 is shown. To achieve proper coverage of an area of soil 603, a user can install multiple systems to cover the area. The areas of detection may be made to overlap to ensure maximum coverage. Each system 600 reports detected soil characteristic data from the respective area of detection on a regular schedule or on demand. The reported soil characteristics are sent to a central controller or computing device. Alternatively, each system stores detected data, and a user manually collects the data (e.g., by downloading data through a network interface in communication with the individual controller of each system 600, by downloading data from each system onto a removable storage medium, etc.).

In addition to generating pre-planting operation map data (as performed in system 400), a grouping of system 600 towers (as shown in FIG. 6B) can advantageously provide regularly updating soil characteristics. For example, it is contemplated that a system of watering sprinklers can be controlled by a controller that receives regular feedback indicating the moisture content of soil 603. Accordingly, sprinklers are activated only when the detected soil moisture level falls below a designated threshold value. Such a watering system may reduce the amount of water used when compared to sprinkler system activated according to a schedule. Further, as an additional example, it is contemplated that a user can configure alerts or notifications as to when nutrients in soil 603 and pesticides in soil 603 are depleted, and the precise locations of the depletions. Accordingly, the user is alerted when additional fertilizer or pesticides need to be placed.

Figure 7:
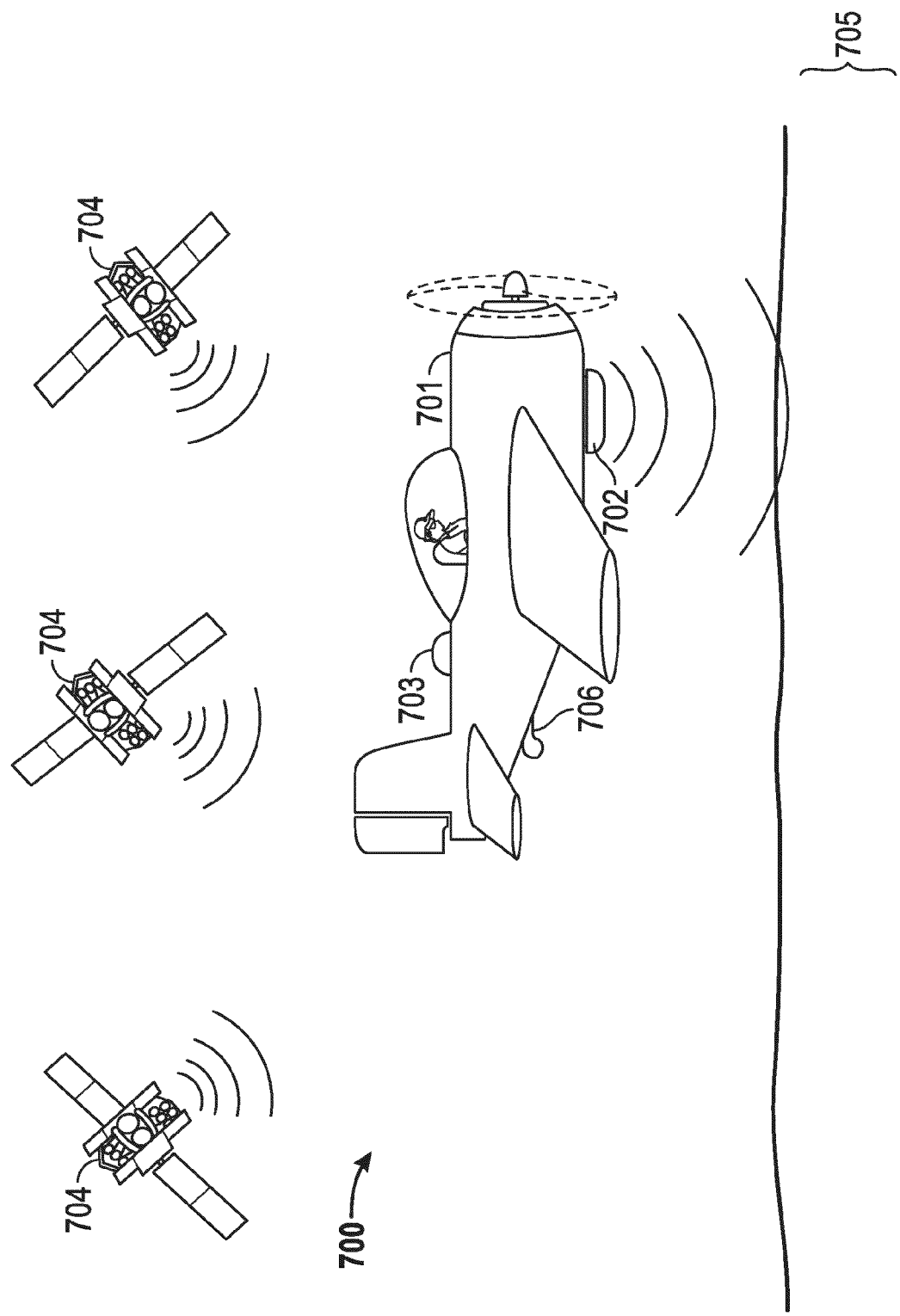
FIG. 7 is an aerial soil characteristic detection system according to an exemplary embodiment.

Referring to FIG. 7, an air-based soil characteristic detection system 700 is shown in accordance with an exemplary embodiment. System 700 includes airplane 701 having radar unit 702 and GPS receiver 703. Although FIG. 7 is drawn as using airplane 701, any suitable aircraft configured to detect and map intrinsic and extrinsic soil characteristics (e.g., a helicopter, a plane, a balloon, a flying drone, etc.) may be used as part of an air-based soil characteristic detection system. System 700 functions in a similar manner to system 200 and system 400. GPS receiver 703 receives signals from GPS satellites 203 enabling a controller of system 700 to accurately track the location of airplane 701. The controller of system 700 is similar to controller 220 and controller 410. The controller of system 700 includes at least a processing circuit having a processor and memory. Radar unit 702 utilizes ground penetrating radar to determine characteristics of soil 705. As in system 200 and system 400, the controller of system 700 is configured to process feedback signals from GPS receiver 703 and radar unit 702 into a detailed map of soil 705. As airplane 701 flies over soil 705, the controller receives feedback signals from radar unit 702 and GPS receiver 703.

The controller is configured to process the received feedback signals to create a detailed map of soil 705. The map created by system 700 is a collection of data points coupled to location information, that when processed, may be reproduced into a visual representation of the map (e.g., for viewing by an operator through a display) or a set of data and location points for further processing by a system controller (e.g., to determine proper seed placement). The collected map data points may be stored in an R-tree data structure, an array data structure, or another suitable data structure. The map may be a three-dimensional map. The three-dimensional map includes location specific information pertaining to the composition of soil 705 (e.g., chemical composition, moisture composition, density, humus presence, etc.), the presence of objects (e.g., buried rocks, pipes, etc.), and other information pertaining to soil 705 up to a certain depth beneath the surface of soil 705. The depth parameter of the three-dimensional map (e.g., one foot beneath the surface, two feet beneath the surface, etc.) may be a user provided parameter. The controller is configured to analyze feedback signals from radar unit 702 to locate and identify objects underneath the surface of soil 705 (e.g., rocks, soil water, delivery pipes, etc.). Detected objects are identified by radar signatures in the same manner as described above with respect to system 200 and system 400. The created map can be exported to an external computing device via a network interface of the controller or stored on removable storage media (e.g., SD memory card, MicroSD memory card, USB flash memory, etc.). The user can then reference the created map for assistance during future soil processing operations (e.g., planting, harvesting, tilling, object extraction, etc.).

Airplane 701 further includes spraying device 706. Spraying device 706 is configured to spray liquids (e.g., chemicals, water, pesticides, fertilizer, etc.) onto soil 705 as airplane 701 flies over soil 705. It is contemplated that the controller of system 700 is configured to spray the liquids at precise locations based on detected soil characteristics. For example, if the controller determines that an area of soil requires spraying of a chemical based on feedback from radar unit 702, the controller can activate spraying device 706 such that the sprayed chemical coats the target area of land. In order to properly determine where the sprayed chemical will land, controller receives feedback from additional sensors on airplane 701 (e.g., altitude sensor, wind direction sensor, wind speed sensor, air speed indicator, etc.). After spraying the liquids, the controller further updates the created map data to indicate that the liquid was sprayed at the specific location.

The above systems and methods can be operated as part of a business. The business offers soil mapping services to customers. Customers can purchase individual maps of an area of soil. Alternatively, customers can subscribe to recurring maps (e.g., a new map every growing season, a new map every month, etc.). The maps can be used for soil operations (e.g., planting operations, harvesting operations, tilling operations, etc.). Additionally, the maps can be used to assist with construction and placement of irrigation systems. Further, customers can purchase precision planting of fields. The business can use detected soil characteristics to maximize crop yield and minimize costs (e.g., fertilizer costs, pesticide costs, watering costs) through strategic placement. The business may further lease soil mapping and/or precision planting equipment to its customers. All of the above mentioned services are provided to customers for a fee.

Although the above systems and methods refer to the planting of seeds, it should be understood that the above systems and methods may be used to plant plants at various stages in development. Accordingly, instead of a seed planting mechanism (e.g. planting device 202 or planting device 502), a plant planting mechanism can place plants of various levels of plant maturity (e.g., seedlings, juvenile plants, adult plants, etc.) in specified and precise locations.

The construction and arrangement of the systems and methods as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. The elements and/or assemblies of the enclosure may be constructed from any of a wide variety of materials that provide sufficient strength or durability, and in any of a wide variety of colors, textures, and combinations. Additionally, in the subject description, the word "exemplary" is used to mean serving as an example, instance, or illustration. Any embodiment or design described herein as "exemplary" is not necessarily to be construed as preferred or advantageous over other embodiments or designs. Rather, use of the word "exemplary" is intended to present concepts in a concrete manner. Accordingly, all such modifications are intended to be included within the scope of the present inventions. The order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes, and omissions may be made in the design, operating conditions, and arrangement of the preferred and other exemplary embodiments without departing from scope of the present disclosure or from the spirit of the appended claims.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures, and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps, and decision steps.

What is claimed is:
1. A soil detection apparatus comprising:
a housing;
a controller;
a non-contact soil sensor coupled to the housing, the non-contact soil sensor configured to scan a soil mate- rial and to provide a sensor feedback signal to the controller with respect to a characteristic of the soil material; and a location sensor configured to provide a location feedback signal to the controller;

wherein the controller is configured to create a map of the soil material based on the sensor feedback signal and the location feedback signal.

2. The apparatus of claim 1, wherein the soil characteristic is an intrinsic characteristic of the soil material comprising at least one of a composition of the soil material, a water property of the soil material, a presence of humus in the soil material, a density of the soil material, and a soil material porosity.

3. The apparatus of claim 1, wherein the controller analyzes the location feedback signal to determine a specific location of the soil characteristic.

4. The apparatus of claim 3, wherein the controller indicates the soil characteristic on the map at the specific location.

5. The apparatus of claim 1, wherein the characteristic is an extrinsic characteristic of the soil material.

6. The apparatus of claim 5, wherein the extrinsic characteristic comprises a presence of the soil material.

7. The apparatus of claim 5, wherein the extrinsic characteristic comprises a depth of the soil material.

8. The apparatus of claim 5, wherein the extrinsic characteristic comprises a presence of an object beneath the surface of the soil material.

9. The apparatus of claim 8, wherein the controller identifies the object based on the sensor feedback signal.

10. The apparatus of claim 5, wherein the controller analyzes the location feedback signal to determine a specific location of the extrinsic soil characteristic.

11. The apparatus of claim 10, wherein the controller updates the map with an indication of a location of the extrinsic soil characteristic.

12. The apparatus of claim 1, wherein the housing is configured to be mounted in a bed of a pickup truck.

13. The apparatus of claim 1, wherein the housing is part of the ground-driven vehicle.

14. An air-based soil detection apparatus comprising:
an aircraft;
a controller;
a soil sensor coupled to the aircraft, the soil sensor configured to locate at least a portion of an irrigation system contained within a soil material or on a surface of the soil material, wherein the soil sensor is further configured to provide a sensor feedback signal relating to the detected portion of the irrigation system to the controller; and
a location sensor coupled to the aircraft, the location sensor configured to provide a location feedback signal to the controller;
wherein the controller is configured to create a map of the soil material including a location of the portion of the irrigation system based on the sensor feedback signal and the location feedback signal.

15. The apparatus of claim 14, wherein the soil sensor is a ground penetrating radar unit that emits electromagnetic radio waves into the soil material.

16. The apparatus of claim 14, wherein the soil sensor is a reflection seismology sensor that transmits acoustic waves into the soil material.

17. The apparatus of claim 14, wherein the aircraft is an airplane.

18. The apparatus of claim 14, further comprising a spraying device coupled to the aircraft.

19. The apparatus of claim 18, wherein the controller instructs the spraying device to spray a liquid over a target area of land.

20. The apparatus of claim 19, wherein the controller updates the map with an indication of a location of the liquid.

21. The apparatus of claim 14, further including memory coupled to the controller, wherein the controller stores the map in the memory.

22. The apparatus of claim 14, further comprising a network interface coupled to the controller.

23. The apparatus of claim 22, wherein the controller exports the map to an external computing device through the network interface.

24. A apparatus comprising:
a vehicle;
a controller;
a soil sensor coupled to the vehicle, the soil sensor configured to locate at least a portion of an irrigation system contained within a soil material or on a surface of the soil material, wherein the soil sensor is further configured to provide a sensor feedback signal relating to the detected portion of the irrigation system to the controller; and
a location sensor coupled to the vehicle, the location sensor configured to provide a location feedback signal to the controller;
wherein the controller is configured to create a map of the soil material including a location of the portion of the irrigation system based on the sensor feedback signal and the location feedback signal.

25. The apparatus of claim 24, wherein the soil sensor is a ground penetrating radar unit that emits electromagnetic radio waves into the soil material.

26. The apparatus of claim 24, wherein the soil sensor is a reflection seismology sensor that transmits acoustic waves into the soil material.

27. The apparatus of claim 24, wherein the vehicle is an airplane.

28. The apparatus of claim 24, wherein the vehicle is a ground-driven vehicle.

29. The apparatus of claim 24, further comprising a spraying device coupled to the vehicle.

30. The apparatus of claim 24, wherein the controller instructs the spraying device to spray a liquid over a target area of land.

31. The apparatus of claim 30, wherein the controller updates the map with an indication of a location of the liquid.

32. The apparatus of claim 24, further including memory coupled to the controller, wherein the controller stores the map in the memory.

33. The apparatus of claim 24, further comprising a network interface coupled to the controller.

34. The apparatus of claim 24, wherein the controller exports the map to an external computing device through the network interface.

35. A soil detection and planting apparatus comprising:
a vehicle;
a controller;
a planting device coupled to the vehicle, the planting device configured to plant seeds or plants into a soil material at varying depths;

a non-contact soil sensor in communication with the controller and configured to provide a sensor feedback signal to the controller with respect to a characteristic of the soil material; and wherein the controller is configured to:
 determine a designated planting depth in the soil material based on the sensor feedback signal, and
 instruct placement of a seed or a plant into the soil material at the designated planting depth by the planting device.

* * * * *